(12) United States Patent
Watanabe et al.

(10) Patent No.: US 12,263,592 B2
(45) Date of Patent: Apr. 1, 2025

(54) AUTONOMOUS MOBILE BODY, INFORMATION PROCESSING METHOD, AND INFORMATION PROCESSING DEVICE

(71) Applicant: SONY GROUP CORPORATION, Tokyo (JP)

(72) Inventors: Hiroto Watanabe, Tokyo (JP); Daisuke Mochizuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 324 days.

(21) Appl. No.: 17/755,184

(22) PCT Filed: Oct. 16, 2020

(86) PCT No.: PCT/JP2020/039055
§ 371 (c)(1),
(2) Date: Apr. 22, 2022

(87) PCT Pub. No.: WO2021/085175
PCT Pub. Date: May 6, 2021

(65) Prior Publication Data
US 2022/0355470 A1 Nov. 10, 2022

(30) Foreign Application Priority Data
Nov. 1, 2019 (JP) .................................. 2019-199864

(51) Int. Cl.
*B25J 9/16* (2006.01)
*A63H 11/20* (2006.01)
(Continued)

(52) U.S. Cl.
CPC ............. *B25J 9/163* (2013.01); *B25J 11/001* (2013.01); *B25J 13/00* (2013.01); *A63H 11/20* (2013.01); *A63H 2200/00* (2013.01)

(58) Field of Classification Search
CPC ...................................................... A63H 11/20
See application file for complete search history.

(56) References Cited

U.S. PATENT DOCUMENTS

| 2002/0165642 | A1  | 11/2002 | Sakaue et al. |
| 2007/0213872 | A1* | 9/2007  | Matsuzaki ............. A63H 11/00 700/245 |
| 2021/0094167 | A1* | 4/2021  | Lee ........................... B25J 13/08 |

FOREIGN PATENT DOCUMENTS

| EP | 1074352 A2     | 2/2001 |
| JP | 2001-051970 A  | 2/2001 |

(Continued)

OTHER PUBLICATIONS

Yoji Kanzaki, "Three core factors and AI technologies that support aibo's sense of life and individuality Sony talks about the secret story developed and advanced technology AI/ SUM 2019", Robotstart, Apr. 23, 2019, 17 Pages.

(Continued)

*Primary Examiner* — Jaime Figueroa
*Assistant Examiner* — Jerrod Irvin Davis
(74) *Attorney, Agent, or Firm* — CHIP LAW GROUP

(57) ABSTRACT

Provided is an autonomous mobile body, an information processing method, and an information processing device that enable a user to experience discipline for the autonomous mobile body. The autonomous mobile body includes a recognition unit that recognizes an instruction given, an action planning unit that plans an action on the basis of the instruction recognized, and an operation control unit that controls execution of the action planned, in which the action planning unit changes a detail of a predetermined action as an action instruction that is an instruction for the predetermined action is repeated. The present technology can be applied to a robot, for example.

16 Claims, 35 Drawing Sheets

(51) Int. Cl.
  *B25J 11/00* (2006.01)
  *B25J 13/00* (2006.01)

(56) References Cited

FOREIGN PATENT DOCUMENTS

| | | |
|---|---|---|
| JP | 2002-163631 A | 6/2002 |
| JP | 2003-159681 A | 6/2003 |
| JP | 2006-088282 A | 4/2006 |
| WO | 2019/138618 A1 | 7/2019 |
| WO | 2019/142229 A1 | 7/2019 |

OTHER PUBLICATIONS

"Good Ways of Raising aibo: The Trick is Leaving it On", Prebell, Jul. 26, 2018.
"I Got My aibo to Kick the Ball", Aibo Behavior, Yuzu-Pon, Fun!Fun!aibo, Mar. 29, 2019, 16 pages.
"How to Housetrain Your aibo", Fun!Fun!aibo, Nov. 18, 2018, 12 pages.
"New Function for Welcoming Its Master Home", Impress Watch, Jun. 19, 2020, 03 pages.
International Search Report and Written Opinion of PCT Application No. PCT/JP2020/039055, issued on Dec. 15, 2020, 12 pages of ISRWO.

\* cited by examiner

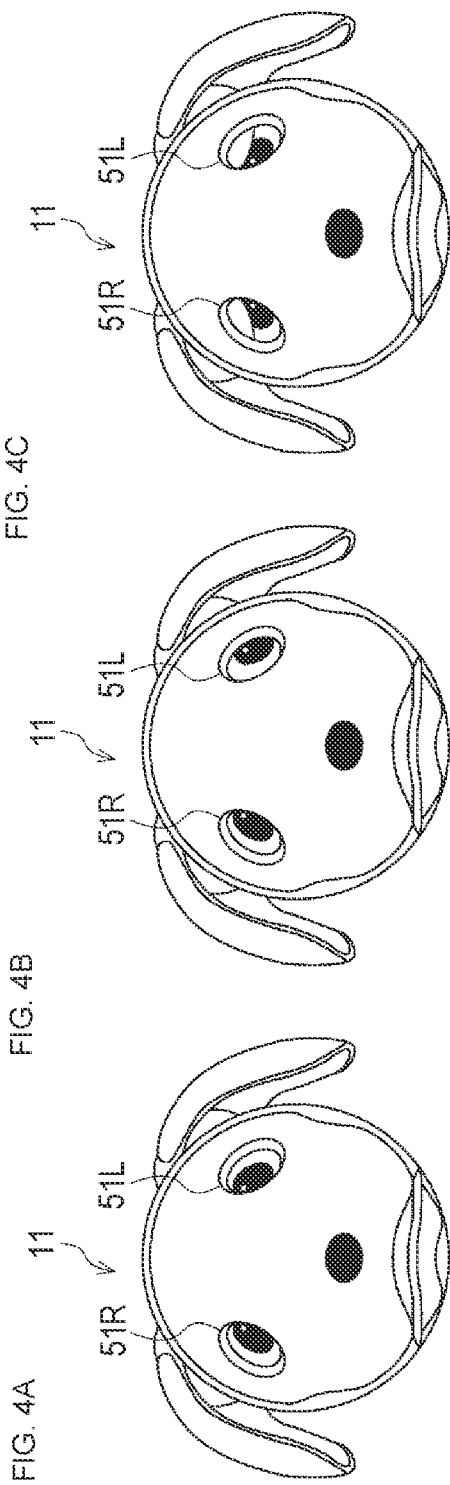

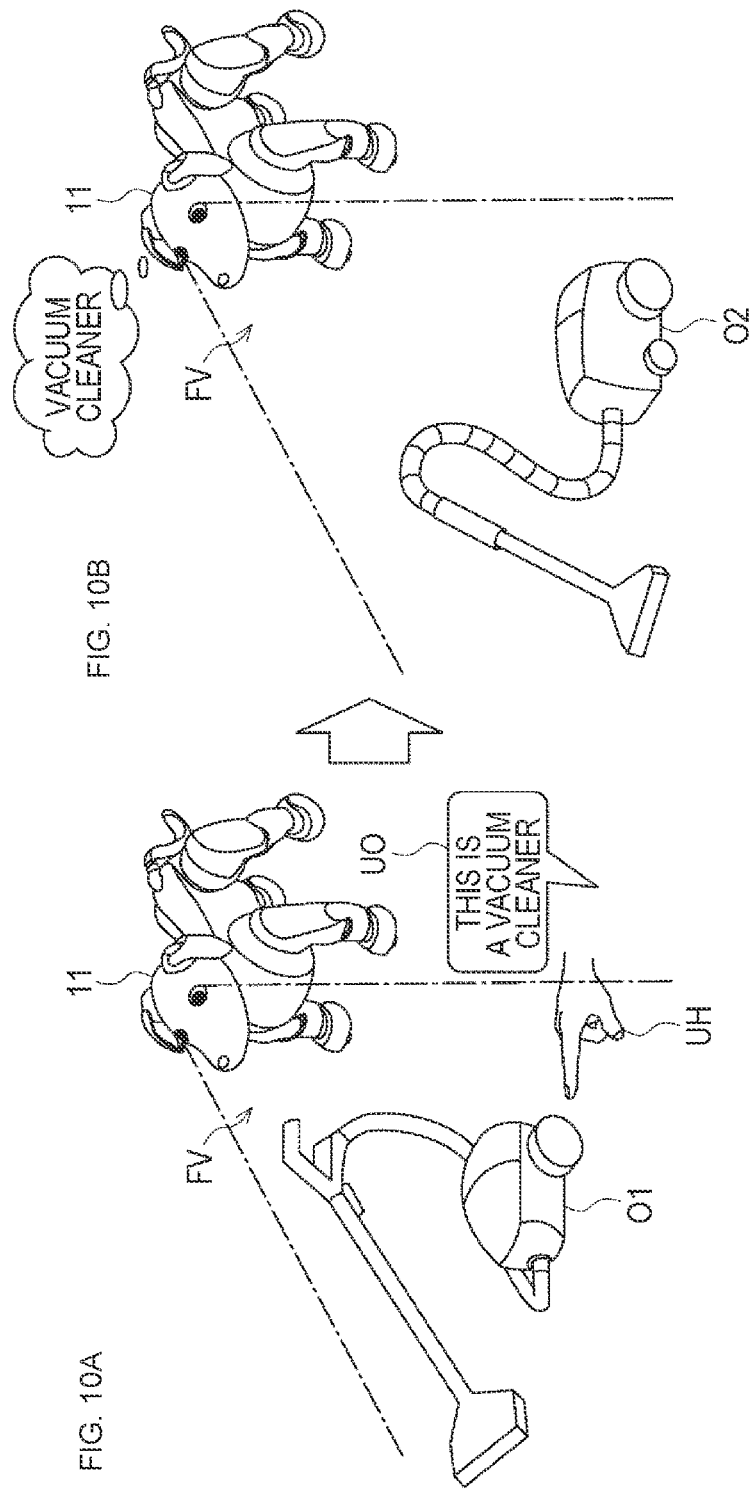

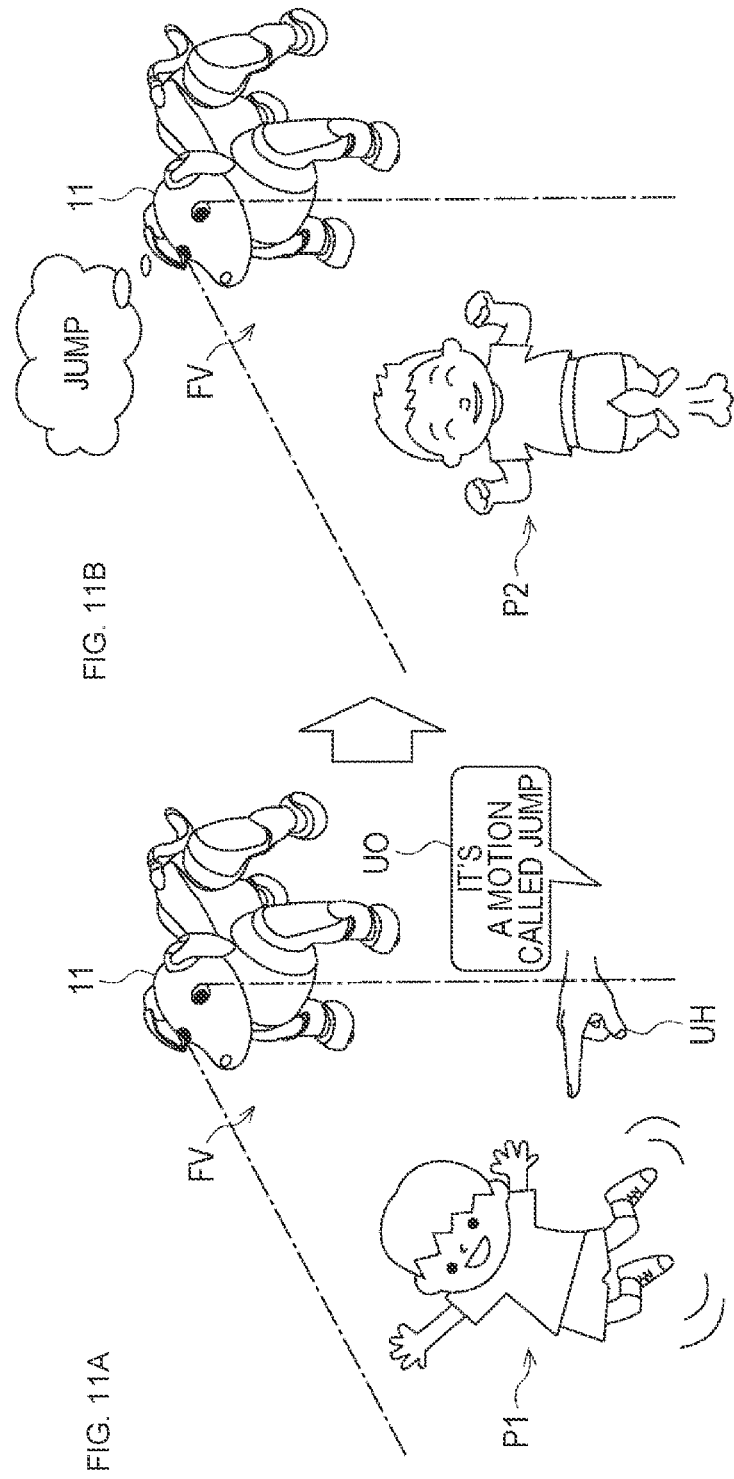

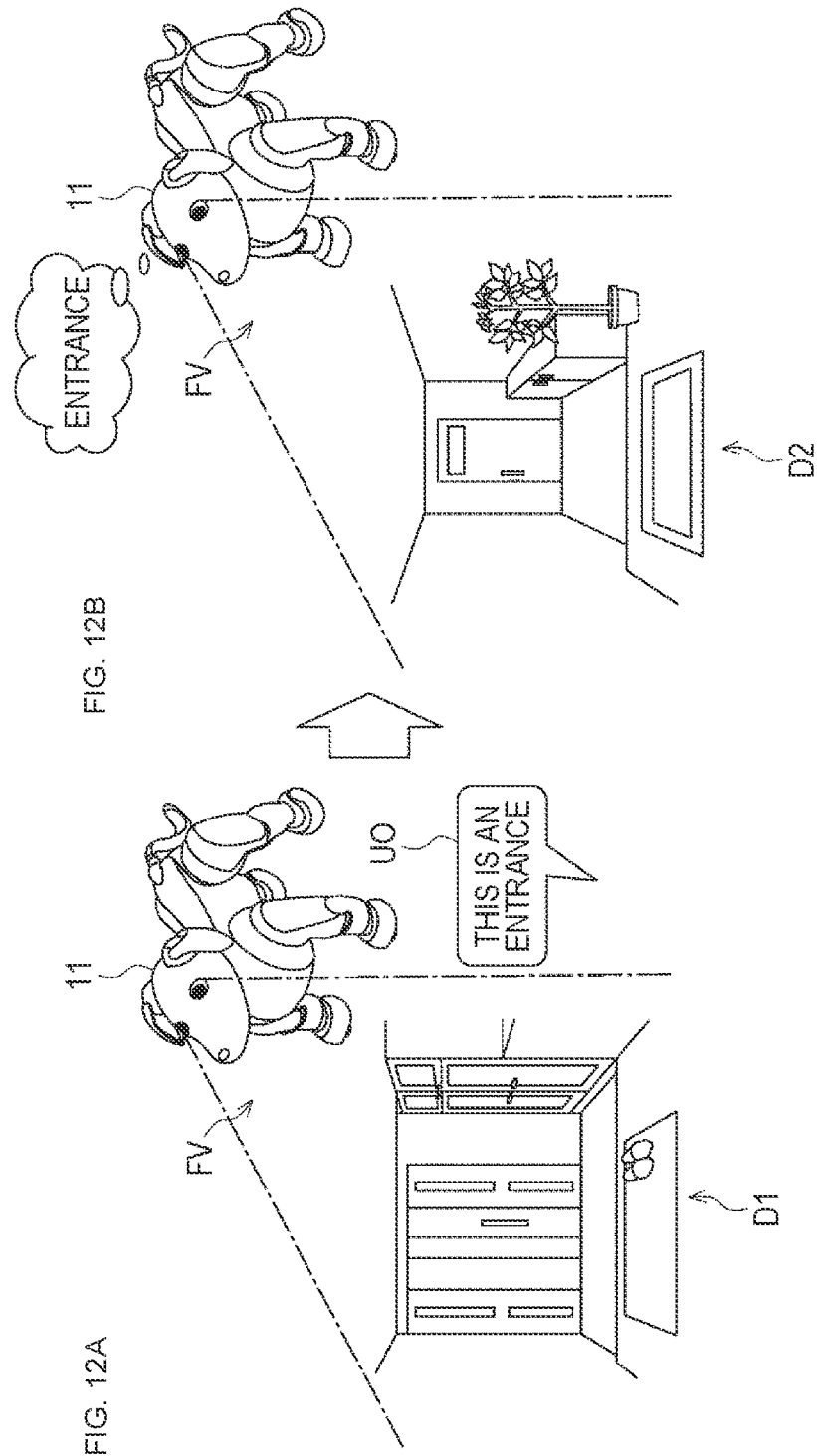

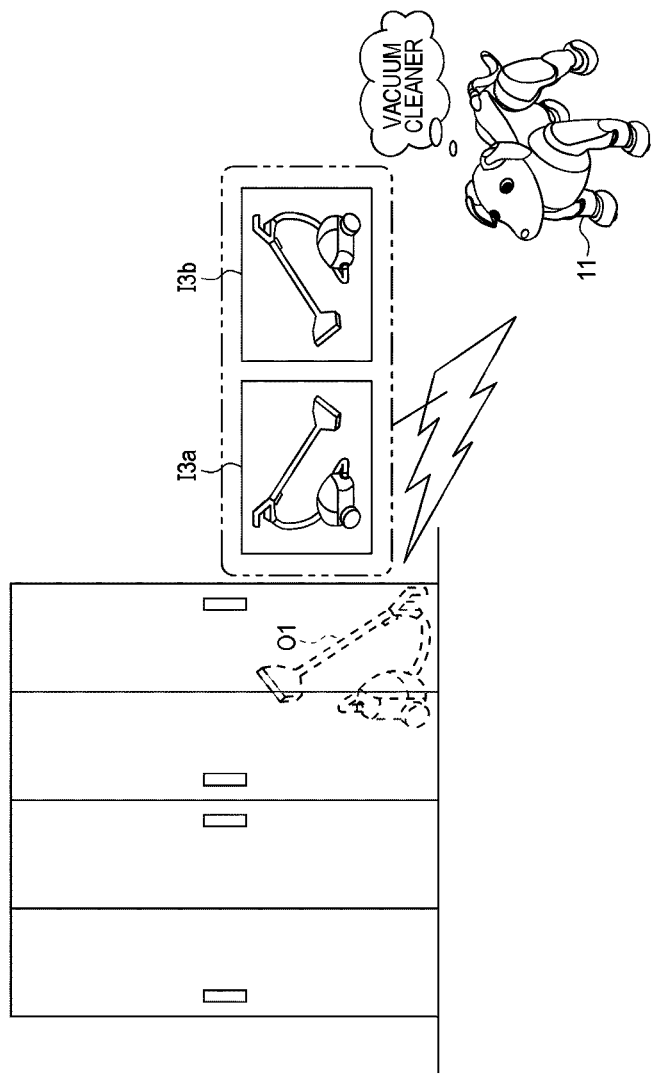

AUTONOMOUS MOBILE BODY, INFORMATION PROCESSING METHOD, AND INFORMATION PROCESSING DEVICE

CROSS REFERENCE TO RELATED APPLICATIONS

This application is a U.S. National Phase of International Patent Application No. PCT/JP2020/039055 filed on Oct. 16, 2020, which claims priority benefit of Japanese Patent Application No. JP 2019-199864 filed in the Japan Patent Office on Nov. 1, 2019. Each of the above-referenced applications is hereby incorporated herein by reference in its entirety.

TECHNICAL FIELD

The present technology relates to an autonomous mobile body, an information processing method, a program, and an information processing device, and in particular, relates to an autonomous mobile body, an information processing method, a program, and an information processing device that enable a user to experience discipline for the autonomous mobile body.

BACKGROUND ART

Attempts have conventionally been made to bring actions of animal-type autonomous mobile bodies closer to actions of actual animals. For example, an animal-type autonomous mobile body has been devised that performs marking behavior for indicating territory (see, for example, Patent Document 1).

CITATION LIST

Patent Document

Patent Document 1: WO 2019/138618 A

SUMMARY OF THE INVENTION

Problems to be Solved by the Invention

By the way, one of the pleasures of keeping a pet is to discipline the pet so that it can perform a desired action. Thus, by making it possible to discipline an autonomous mobile body similarly to an actual pet, it can be expected that the user experience for the autonomous mobile body will be improved.

The present technology has been made in view of such a situation, and enables a user to experience discipline for the autonomous mobile body.

Solutions to Problems

An autonomous mobile body of one aspect of the present technology includes: a recognition unit that recognizes an instruction given; an action planning unit that plans an action on the basis of the instruction recognized; and an operation control unit that controls execution of the action planned, in which the action planning unit changes a detail of a predetermined action as an action instruction that is an instruction for the predetermined action is repeated.

An information processing method of one aspect of the present technology: recognizes an instruction given to an autonomous mobile body; plans an action of the autonomous mobile body on the basis of the instruction recognized, and changes a detail of a predetermined action as an action instruction that is an instruction for the predetermined action is repeated; and controls execution of the action of the autonomous mobile body planned.

A program of one aspect of the present technology causes a computer to execute processing of: recognizing an instruction given to an autonomous mobile body; planning an action of the autonomous mobile body on the basis of the instruction recognized, and changing a detail of a predetermined action as an action instruction that is an instruction for the predetermined action is repeated; and controlling execution of the action of the autonomous mobile body planned.

An information processing device of one aspect of the present technology includes: a recognition unit that recognizes an instruction given to an autonomous mobile body; an action planning unit that plans an action of the autonomous mobile body on the basis of the instruction recognized; and an operation control unit that controls execution of the action of the autonomous mobile body planned, in which the action planning unit changes a detail of a predetermined action by the autonomous mobile body as an action instruction that is an instruction for the predetermined action is repeated.

According to one aspect of the present technology, the instruction given to the autonomous mobile body is recognized, the action of the autonomous mobile body is planned on the basis of the instruction recognized, and the detail of the predetermined action is changed as the action instruction that is the instruction for the predetermined action is repeated, and the action of the autonomous mobile body planned is executed.

BRIEF DESCRIPTION OF DRAWINGS

FIGS. 4A, 4B, and 4C are diagrams for explaining a function of a display included in the autonomous mobile body.

FIGS. 10A and 10B are diagrams illustrating an outline of pattern recognition learning based on teaching.

FIGS. 11A and 11B are diagrams illustrating an outline of motion recognition learning based on teaching.

FIGS. 12A and 12 are diagrams illustrating an outline of spatial area recognition learning based on teaching.

FIG. 14 is a diagram for explaining teaching using wireless communication.

MODE FOR CARRYING OUT THE INVENTION

The following is a description of embodiments for carrying out the present technology. The description will be given in the following order.
1. Embodiment
2. Modifications
3. Others 1. Embodiment First, an embodiment of the present technology will be described with reference to FIGS. 1, 2, 3, 4A, 4B, 4C, 5A, 5B, 6, 7, 8, 9, 10A, 10B, 11A, 11B, 12A, 12B, 13A, 13B, 14, 15A, 15B, 16, 17, 18, 19, 20, 21, 22, 23, 24, 25, 26, 27, 28, 29, 30, 31, 32, 33, 34, and 35.

<Configuration Example of Information Processing System 1>

Figure 1:
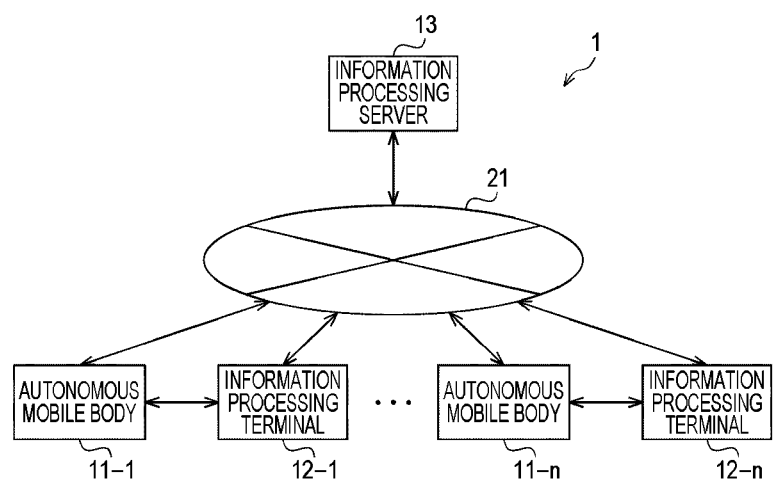
FIG. 1 is a block diagram illustrating an embodiment of an information processing system to which the present technology is applied.

FIG. 1 is a block diagram illustrating an embodiment of an information processing system 1 to which the present technology is applied.

The information processing system 1 includes an autonomous mobile body 11-1 to an autonomous mobile body 11-n, an information processing terminal 12-1 to an information processing terminal 12-n, and an information processing server 13.

Note that, hereinafter, in a case where it is not necessary to individually distinguish the autonomous mobile body 11-1 to the autonomous mobile body 11-n from each other, it is simply referred to as an autonomous mobile body 11. Hereinafter, in a case where it is not necessary to individually distinguish the information processing terminal 12-1 to the information processing terminal 12-n from each other, it is simply referred to as an information processing terminal 12.

Between each autonomous mobile body 11 and the information processing server 13, between each information processing terminal 12 and the information processing server 13, between each autonomous mobile body 11 and each information processing terminal 12, between the autonomous mobile bodies 11, and between the information processing terminals 12, communication is possible via the network 21. Furthermore, it is also possible to directly communicate between each autonomous mobile body 11 and each information processing terminal 12, between the autonomous mobile bodies 11, and between the information processing terminals 12, without going through the network 21.

The autonomous mobile body 11 is an information processing device that recognizes situations of the autonomous mobile body 11 and its surroundings on the basis of collected sensor data and the like, and autonomously selects and executes various operations depending on the situations. One of features of the autonomous mobile body 11 is that it autonomously executes an appropriate operation depending on a situation, unlike a robot that simply performs an operation depending on a user's instruction.

For example, the autonomous mobile body 11 can execute user recognition, object recognition, and the like based on a captured image, and can perform various autonomous actions depending on a recognized user, object, and the like. Furthermore, the autonomous mobile body 11 can also execute, for example, voice recognition based on the user's utterance and perform an action based on the user's instruction or the like.

Moreover, the autonomous mobile body 11 performs pattern recognition learning to acquire abilities of the user recognition and the object recognition. At this time, the autonomous mobile body 11 can perform not only supervised learning based on given learning data but also perform pattern recognition learning related to the object or the like by dynamically collecting learning data on the basis of teaching by the user or the like.

Furthermore, the autonomous mobile body 11 can be disciplined by the user. Here, discipline for the autonomous mobile body 11 is broader than general discipline in which rules and prohibitions are taught and caused to be remembered, for example, and means that a change appears that can be felt by the user in the autonomous mobile body 11 due to that the user interacts the autonomous mobile body 11.

A shape, an ability, and a level of desire or the like of the autonomous mobile body 11 can be appropriately designed depending on a purpose and a role. For example, the autonomous mobile body 11 is configured by an autonomous mobile robot that autonomously moves in a space and executes various operations. Specifically, for example, the autonomous mobile body 11 is configured by an autonomous mobile robot having a shape and operational ability imitating an animal such as a human or a dog. Furthermore, for example, the autonomous mobile body 11 is configured by a vehicle or another device having an ability to communicate with the user.

The information processing terminal 12 includes, for example, a smartphone, a tablet terminal, a personal computer (PC), or the like, and is used by the user of the autonomous mobile body 11. The information processing terminal 12 implements various functions by executing a predetermined application program (hereinafter, simply referred to as an application). For example, the information processing terminal 12 communicates with the information processing server 13 via the network 21 or directly communicates with the autonomous mobile body 11, to collect various data regarding the autonomous mobile body 11 and present the data to the user, or give an instruction to the autonomous mobile body 11.

For example, the information processing server 13 collects various data from each autonomous mobile body 11 and each information processing terminal 12, provides various data to each autonomous mobile body 11 and each information processing terminal 12, or controls operation of the autonomous mobile body 11. Furthermore, for example, the information processing server 13 can also perform pattern recognition learning, and processing corresponding to the user's discipline, similarly to the autonomous mobile body 11, on the basis of the data collected from each autonomous mobile body 11 and each information processing terminal 12. Moreover, for example, the information processing server 13 supplies various data regarding the above-described application and each autonomous mobile body 11 to each information processing terminal 12.

The network 21 includes some of, for example, public line networks such as the Internet, a telephone line network, and a satellite communication network, various local area networks (LANs) including Ethernet (registered trademark), a wide area network (WAN), and the like. Furthermore, the network 21 may include a dedicated line network such as an Internet protocol-virtual private network (IP-VPN). Furthermore, the network 21 may include a wireless communication network such as Wi-Fi (registered trademark) or Bluetooth (registered trademark).

Note that, the configuration of the information processing system 1 can be flexibly changed depending on specifications, operation, and the like. For example, the autonomous mobile body 11 may further perform information communication with various external devices in addition to the information processing terminal 12 and the information processing server 13. The external devices may include, for example, a server that transmits weather, news, and other service information, and various home appliances owned by the user.

Furthermore, for example, the autonomous mobile body 11 and the information processing terminal 12 do not necessarily have to have a one-to-one relationship, and may have, for example, a many-to-many, many-to-one, or one-to-many relationship. For example, one user can confirm data regarding a plurality of the autonomous mobile bodies 11 by using one information processing terminal 12, or confirm data regarding one autonomous mobile body 11 by using a plurality of information processing terminals.

<Hardware Configuration Example of Autonomous Mobile Body 11>

Next, a hardware configuration example of the autonomous mobile body 11 will be described. Note that, in the following, a case where the autonomous mobile body 11 is a dog-shaped quadruped walking robot will be described as an example.

Figure 2:
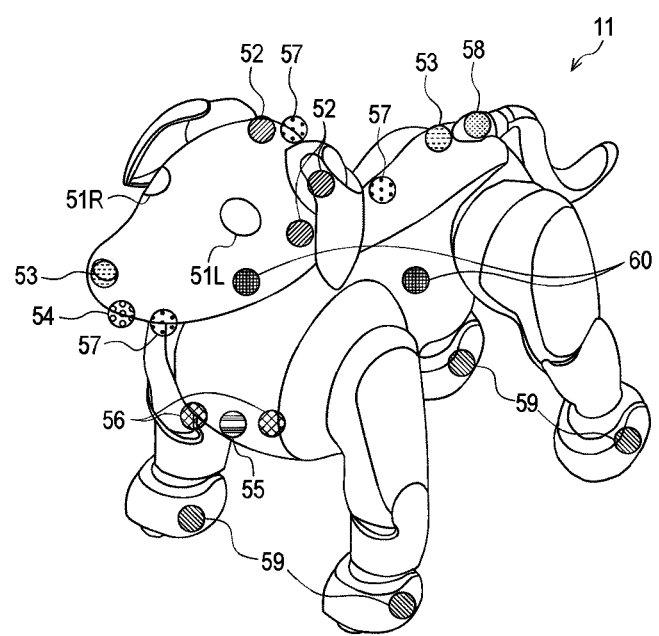
FIG. 2 is a diagram illustrating a hardware configuration example of an autonomous mobile body.

FIG. 2 is a diagram illustrating the hardware configuration example of the autonomous mobile body 11. The autonomous mobile body 11 is the dog-shaped quadruped walking robot including a head, a body, four legs, and a tail.

The autonomous mobile body 11 includes two displays, a display 51L and a display 51R, on the head. Note that, hereinafter, in a case where it is not necessary to individually distinguish the display 51L and the display 51R from each other, it is simply referred to as displays 51.

Furthermore, the autonomous mobile body 11 includes various sensors. The autonomous mobile body 11 includes, for example, a microphone 52, a camera 53, a Time Of Flight (ToF) sensor 525, a motion sensor 55, a distance measurement sensor 56, a touch sensor 57, an illuminance sensor 58, sole buttons 59, and inertial sensors 60.

The autonomous mobile body 11 includes, for example, four microphones 52 on the head. Each microphone 52 collects ambient sounds including, for example, the user's utterances and ambient environmental sounds. Furthermore, by including a plurality of microphones 52, it is possible to collect sounds generated in the surroundings with high sensitivity and to localize a sound source.

The autonomous mobile body 11 includes, for example, two wide-angle cameras 53 at the tip of a nose and a waist, and captures images of the surroundings of the autonomous mobile body 11. For example, the camera 53 arranged at the tip of the nose captures an image in a front field of view (that is, a dog's field of view) of the autonomous mobile body 11. The camera 53 arranged on the waist captures an image of the surroundings centered on the upper part of the autonomous mobile body 11. For example, the autonomous mobile body 11 can implement Simultaneous Localization and Mapping (SLAM) by extracting feature points on the ceiling, or the like, on the basis of the image captured by the camera 53 arranged on the waist.

The ToF sensor 54 is provided, for example, at the tip of the nose and detects a distance to an object existing in front of the head. The autonomous mobile body 11 can detect distances to various objects with high accuracy by the ToF sensor 54, and can implement an operation depending on a relative position with a target object including the user, an obstacle, or the like.

The motion sensor 55 is arranged on a chest, for example, and detects a location of the user or a pet kept by the user. The autonomous mobile body 11 can implement various operations with respect to a moving body, for example, operations corresponding to emotions such as interest, fear, and surprise, by detecting the moving body existing in front by the motion sensor 55.

The distance measurement sensor 56 is arranged on the chest, for example, and detects a situation of a floor surface in front of the autonomous mobile body 11. The autonomous mobile body 11 can detect a distance to an object existing on the floor surface in front with high accuracy by the distance measurement sensor 56, and can implement an operation depending on a relative position with the object.

The touch sensor 57 is arranged at a portion where the user is highly likely to touch of the autonomous mobile body 11, for example, the top of the head, under the chin, the back, or the like, and detects contact by the user. The touch sensor 57 is configured by, for example, a capacitance type or pressure sensitive type touch sensor. The autonomous mobile body 11 can detect a contact action such as touching, stroking, hitting, or pushing by the user by the touch sensor 57, and can perform an operation depending on the contact action.

The illuminance sensor 58 is arranged at the base of the tail on the back surface of the head, for example, and detects an illuminance in the space where the autonomous mobile body 11 is located. The autonomous mobile body 11 can detect ambient brightness by the illuminance sensor 58 and execute an operation depending on the brightness.

The sole buttons 59 are, for example, arranged at portions corresponding to paws of the four legs, respectively, and detect whether or not bottom surfaces of the legs of the autonomous mobile body 11 are in contact with the floor. The autonomous mobile body 11 can detect contact or non-contact with the floor surface by the sole buttons 59, and can grasp, for example, that the autonomous mobile body 11 is lifted up by the user.

The inertial sensors 60 are arranged, for example, on the head and the body, respectively, and detects physical quantities such as velocity, acceleration, and rotation of the head and the body. For example, each of the inertial sensors 60 is configured by a 6-axis sensor that detects acceleration and angular velocity on the X axis, Y axis, and Z axis. The autonomous mobile body 11 can detect motions of the head and the body with high accuracy by the inertial sensors 60, and can implement operation control depending on a situation.

Note that, the configuration of the sensor included in the autonomous mobile body 11 can be flexibly changed depending on the specifications, operation, and the like. For example, in addition to the configuration described above, the autonomous mobile body 11 may further include, for example, a temperature sensor, a geomagnetic sensor, various communication devices including a Global Navigation Satellite System (GNSS) signal receiver, and the like.

Figure 3:
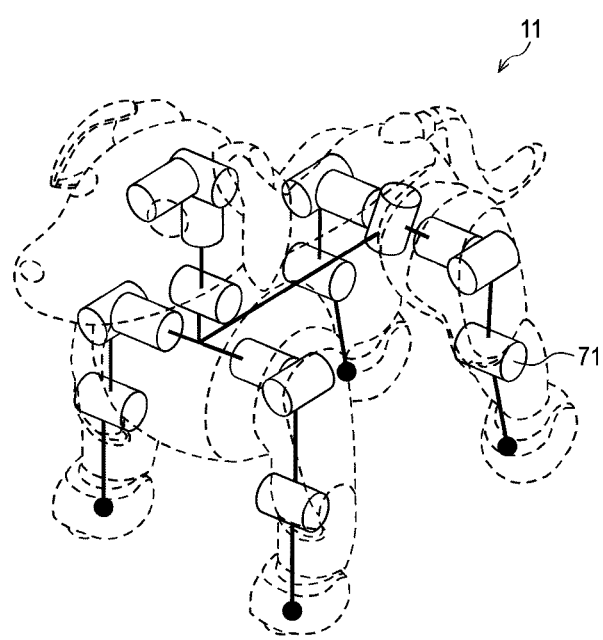
FIG. 3 is a configuration example of an actuator included in the autonomous mobile body.

Next, a configuration example of joint units of the autonomous mobile body 11 will be described with reference to FIG. 3. FIG. 3 illustrates a configuration example of actuators 71 included in the autonomous mobile body 11. The autonomous mobile body 11 has a total of 22 degrees of freedom of rotation, which are rotation points illustrated in FIG. 3 and additionally two each in the ear and the tail and one in the mouth.

For example, the autonomous mobile body 11 has three degrees of freedom in the head, so that it can achieve both nodding and tilting of the neck. Furthermore, the autonomous mobile body 11 can implement a natural and flexible motion closer to that of a real dog by reproducing the swing motion of the waist by the actuators 71 provided in the waist.

Note that, the autonomous mobile body 11 may implement the 22 degrees of freedom of rotation described above by combining, for example, a 1-axis actuator and a 2-axis actuator. For example, the 1-axis actuator may be adopted for elbow and knee portions of the leg, and 2-axis actuator may be adopted for the shoulder and the base of the thigh.

Next, a function of the displays 51 included in the autonomous mobile body 11 will be described with reference to FIGS. 4A, 4B, and 4C.

The autonomous mobile body 11 includes the two displays 51R and 51L corresponding to the right eye and the left eye, respectively. The displays 51 each have a function of visually expressing eye motions and emotions of the autonomous mobile body 11. For example, the displays 51 can express motions of eyeballs, pupils, and eyelids depending on emotions and motions to produce natural motions similar to those of real animals such as dogs, and to express a line-of-sight and emotions of the autonomous mobile body 11 with high accuracy and flexibility. Furthermore, the user can intuitively grasp a state of the autonomous mobile body 11 from the motions of the eyeballs displayed on the displays 51.

Furthermore, the displays 51 are implemented by, for example, two independent Organic Light Emitting Diodes (OLEDs). By using the OLEDs, it is possible to reproduce curved surfaces of the eyeballs. As a result, a more natural exterior can be implemented as compared with a case where one flat display is used to express a pair of eyeballs and a case where two independent flat displays are used to express two eyeballs.

Figure 5A:
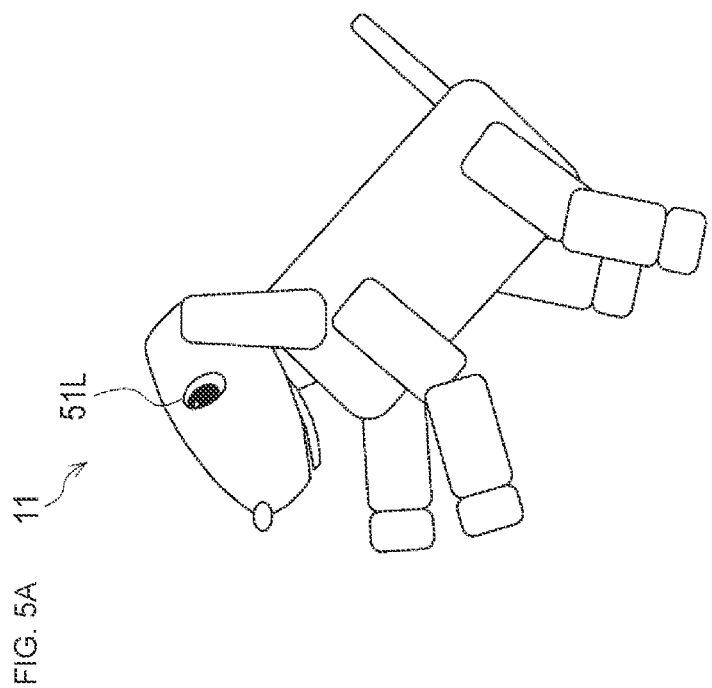
FIGS. 5A and 5B are diagrams illustrating an operation example of the autonomous mobile body.
Figure 5B:
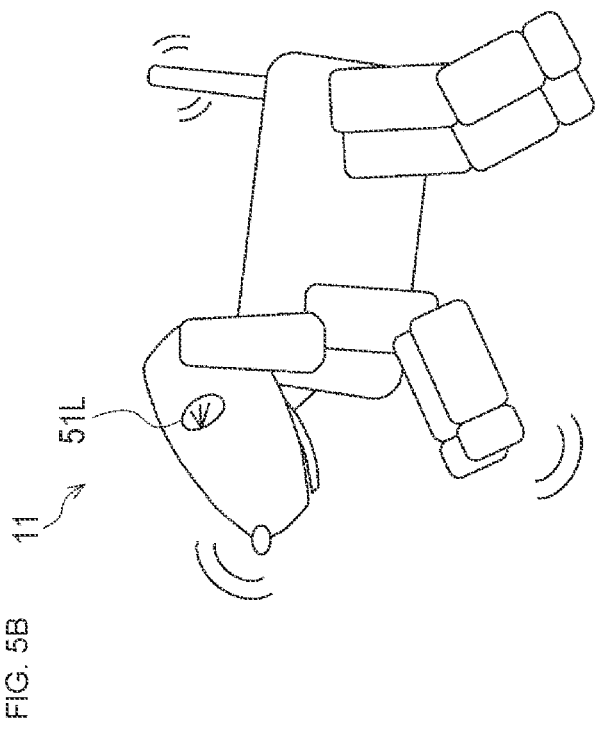

With the configuration described above, the autonomous mobile body 11 reproduces motions and emotional expressions closer to those of a real organism by controlling motions of the joint units and eyeballs with high accuracy and flexibility, as illustrated in FIGS. 5A and 5B.

Note that, FIGS. 5A and 5B are diagrams illustrating an operation example of the autonomous mobile body 11; however, in FIGS. 5A and 5B, since a description will be given by focusing on the motions of the joint units and eyeballs of the autonomous mobile body 11, an external structure of the autonomous mobile body 11 is illustrated in a simplified manner.

<Functional Configuration Example of Autonomous Mobile Body 11>

Figure 6:
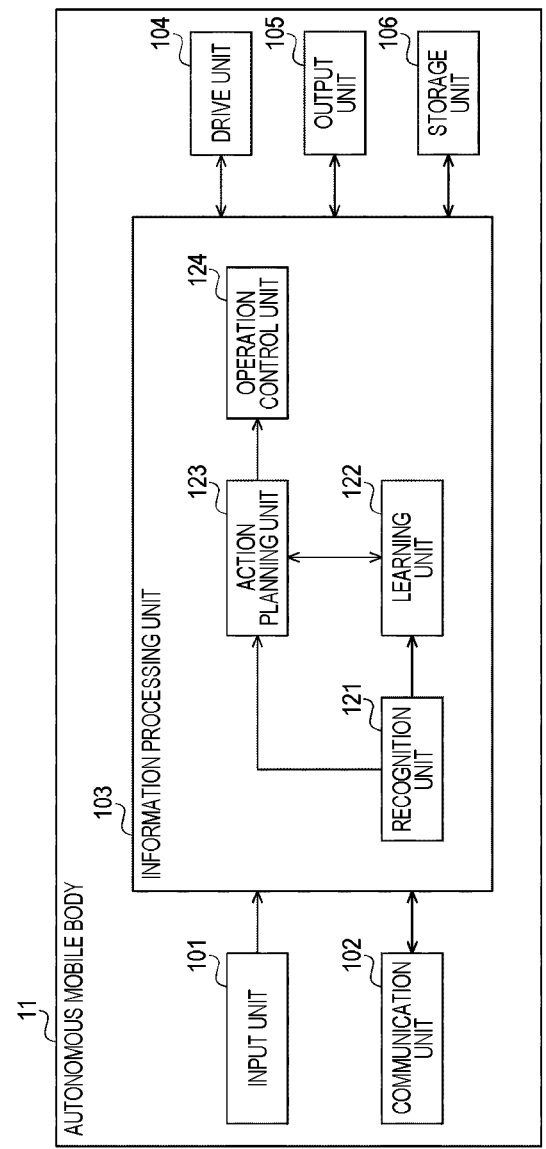
FIG. 6 is a block diagram illustrating a functional configuration example of the autonomous mobile body.

Next, a functional configuration example of the autonomous mobile body 11 will be described with reference to FIG. 6. The autonomous mobile body 11 includes an input unit 101, a communication unit 102, an information processing unit 103, a drive unit 104, an output unit 105, and a storage unit 106.

The input unit 101 includes various sensors and the like illustrated in FIG. 2, and has a function of collecting various sensor data regarding situations of the user and the surroundings. Furthermore, the input unit 101 includes, for example, input devices such as a switch and a button. The input unit 101 supplies the collected sensor data and input data input via the input devices to the information processing unit 103.

The communication unit 102 communicates with another autonomous mobile body 11, the information processing terminal 12, and the information processing server 13 via the network 21 or without the network 21, and transmits and receives various data. The communication unit 102 supplies the received data to the information processing unit 103, and acquires the data to be transmitted from the information processing unit 103.

Note that, a communication method of the communication unit 102 is not particularly limited, and can be flexibly changed depending on the specifications and operation.

The information processing unit 103 includes, for example, a processor such as a Central Processing Unit (CPU), performs various types of information processing, and controls each unit of the autonomous mobile body 11. The information processing unit 103 includes a recognition unit 121, a learning unit 122, an action planning unit 123, and an operation control unit 124.

The recognition unit 121 recognizes a situation in which the autonomous mobile body 11 is placed on the basis of the sensor data and input data supplied from the input unit 101 and the received data supplied from the communication unit 102. The situation in which the autonomous mobile body 11 is placed includes, for example, the situations of the autonomous mobile body 11 and the surroundings. The situation of the autonomous mobile body 11 includes, for example, the state and motion of the autonomous mobile body 11. The situations of the surroundings include, for example, a state, motion, and instruction of a surrounding person such as the user, a state and motion of a surrounding organism such as a pet, a state and motion of a surrounding object, a time, a place, a surrounding environment, and the like. The surrounding object includes, for example, another autonomous mobile body. Furthermore, to recognize the situation, the recognition unit 121 performs, for example, person identification, recognition of a facial expression or line-of-sight, emotion recognition, object recognition, motion recognition, spatial area recognition, color recognition, shape recognition, marker recognition, obstacle recognition, step recognition, brightness recognition, temperature recognition, voice recognition, word understanding, position estimation, posture estimation, and the like.

Furthermore, the recognition unit 121 has a function of estimating and understanding the situation on the basis of various types of recognized information. At this time, the recognition unit 121 may comprehensively estimate the situation by using knowledge stored in advance.

The recognition unit 121 supplies data indicating a result of recognition or a result of estimation of the situation (hereinafter referred to as situation data) to the learning unit 122 and the action planning unit 123. Furthermore, the recognition unit 121 registers the data indicating the result of recognition or the result of estimation of the situation in action history data stored in the storage unit 106.

The action history data is data indicating a history of the action of the autonomous mobile body 11. The action history data includes items of, for example, the date and time when an action is started, the date and time when the action is completed, a trigger for executing the action, a place where an instruction for the action is given (however, in a case where the place is indicated), a situation when the action is performed, and whether or not the action is completed (whether or not the action is executed to the end).

As the trigger for executing the action, for example, in a case where the action is executed triggered by the user's instruction, a detail of the instruction is registered. Furthermore, for example, in a case where the action is executed triggered by a predetermined situation, a detail of the situation is registered. Moreover, for example, in a case where the action is executed triggered by an object indicated by the user or a recognized object, a type of the object is registered.

The learning unit 122 learns the situation and the action, and an influence of the action on the environment, on the basis of the sensor data and input data supplied from the input unit 101, the received data supplied from the communication unit 102, the situation data supplied from the recognition unit 121, data regarding the action of the autonomous mobile body 11 supplied from the action planning unit 123, and the action history data stored in the storage unit 106. For example, the learning unit 122 performs the pattern recognition learning described above, or performs learning of an action pattern corresponding to the user's discipline.

For example, the learning unit 122 implements the learning described above by using a machine learning algorithm such as deep learning. Note that, a learning algorithm adopted by the learning unit 122 is not limited to the example described above, and can be appropriately designed.

The learning unit 122 supplies data indicating a learning result (hereinafter referred to as learning result data) to the action planning unit 123 or stores the data in the storage unit 106.

The action planning unit 123 plans an action to be performed by the autonomous mobile body 11 on the basis of the recognized or estimated situation and the learning result data. The action planning unit 123 supplies data indicating the planned action (hereinafter referred to as action plan data) to the operation control unit 124. Furthermore, the action planning unit 123 supplies data regarding the action of the autonomous mobile body 11 to the learning unit 122, or registers the data in the action history data stored in the storage unit 106.

The operation control unit 124 controls the operation of the autonomous mobile body 11 to execute the planned action by controlling the drive unit 104 and the output unit 105 on the basis of the action plan data. The operation control unit 124 performs, for example, rotation control of the actuators 71, display control of the displays 51, voice output control with the speaker, and the like on the basis of the action plan.

The drive unit 104 bends and stretches the plurality of joint units of the autonomous mobile body 11 on the basis of the control by the operation control unit 124. More specifically, the drive unit 104 drives the actuators 71 included in the respective joint units on the basis of the control by the operation control unit 124.

The output unit 105 includes, for example, the displays 51, the speaker, a haptics device, and the like, and outputs visual information, auditory information, tactile information, and the like on the basis of the control by the operation control unit 124.

The storage unit 106 includes, for example, a non-volatile memory and a volatile memory, and stores various programs and data.

<Configuration Example of Expected Value Calculation Unit 151>

Figure 7:
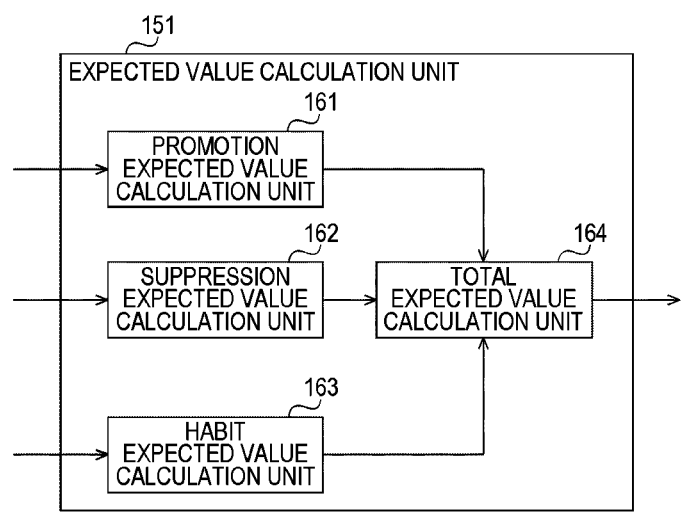
FIG. 7 is a block diagram illustrating a configuration example of an expected value calculation unit of the autonomous mobile body.

FIG. 7 illustrates a configuration example of an expected value calculation unit 151 that is a part of functions implemented by the learning unit 122 and the action planning unit 123.

The expected value calculation unit 151 calculates an expected value indicating a degree of expectation of the user for the autonomous mobile body 11 to perform a predetermined action. The expected value calculation unit 151 includes a promotion expected value calculation unit 161, a suppression expected value calculation unit 162, a habit expected value calculation unit 163, and a total expected value calculation unit 164.

The promotion expected value calculation unit 161 calculates the promotion expected value on the basis of the sensor data and input data supplied from the input unit 101 and the received data supplied from the communication unit 102. The promotion expected value indicates the user's short-term expected value for the autonomous mobile body 11 to execute a predetermined action. For example, the promotion expected value changes when the user gives an instruction to promote the predetermined action. The promotion expected value calculation unit 161 supplies data indicating the calculated promotion expected value to the total expected value calculation unit 164.

The suppression expected value calculation unit 162 calculates the suppression expected value on the basis of the sensor data and input data supplied from the input unit 101 and the received data supplied from the communication unit 102. The suppression expected value indicates the user's short-term expected value for the autonomous mobile body 11 to suppress a predetermined action. For example, the suppression expected value changes when the user gives an instruction to suppress the predetermined action. The suppression expected value calculation unit 162 supplies data indicating the calculated suppression expected value to the total expected value calculation unit 164.

The habit expected value calculation unit 163 calculates the habit expected value on the basis of the action history data stored in the storage unit 106. The habit expected value indicates a habitual expected value of the user for a predetermined action of the autonomous mobile body 11. The habit expected value calculation unit 163 supplies data indicating the calculated habit expected value to the total expected value calculation unit 164.

The total expected value calculation unit 164 calculates a total expected value that is a final expected value, on the basis of the promotion expected value, the suppression expected value, and the habit expected value. The total expected value calculation unit 164 supplies the calculated total expected value to the action planning unit 123.

The action planning unit 123 plans the action of the autonomous mobile body 11 on the basis of, for example, the total expected value.

<Functional Configuration Example of Information Processing Terminal 12>

Figure 8:
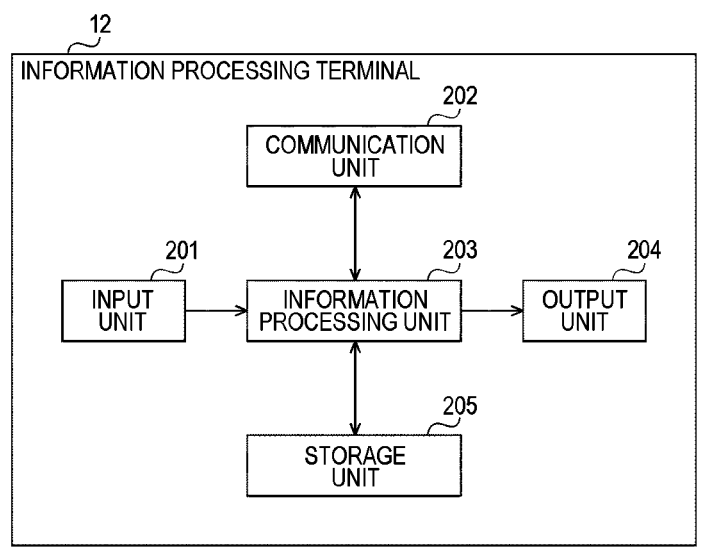
FIG. 8 is a block diagram illustrating a functional configuration example of an information processing terminal.

Next, a functional configuration example of the information processing terminal 12 will be described with reference to FIG. 8. The information processing terminal 12 includes an input unit 201, a communication unit 202, an information processing unit 203, an output unit 204, and a storage unit 205.

The input unit 201 includes, for example, input devices such as a switch and a button. Furthermore, the input unit 201 includes various sensors, for example, a camera, a microphone, an inertial sensor, and the like. The input unit 201 supplies input data input via the input device and sensor data output from the various sensors to the information processing unit 203.

The communication unit 202 communicates with the autonomous mobile body 11, another information processing terminal 12, and the information processing server 13 via the network 21 or without the network 21, and transmits and receives various data. The communication unit 202 supplies the received data to the information processing unit 203, and acquires the data to be transmitted from the information processing unit 203.

Note that, a communication method of the communication unit 202 is not particularly limited, and can be flexibly changed depending on the specifications and operation.

The information processing unit 203 includes, for example, a processor such as a CPU, performs various types of information processing, and controls each unit of the information processing terminal 12.

The output unit 204 includes, for example, a display, a speaker, a haptics device, and the like, and outputs visual information, auditory information, tactile information, and the like on the basis of control by the information processing unit 203.

The storage unit 205 includes, for example, a non-volatile memory and a volatile memory, and stores various programs and data.

Note that, the functional configuration of the information processing terminal 12 can be flexibly changed depending on the specifications and operation.

<Functional Configuration Example of Information Processing Server 13>

Figure 9:
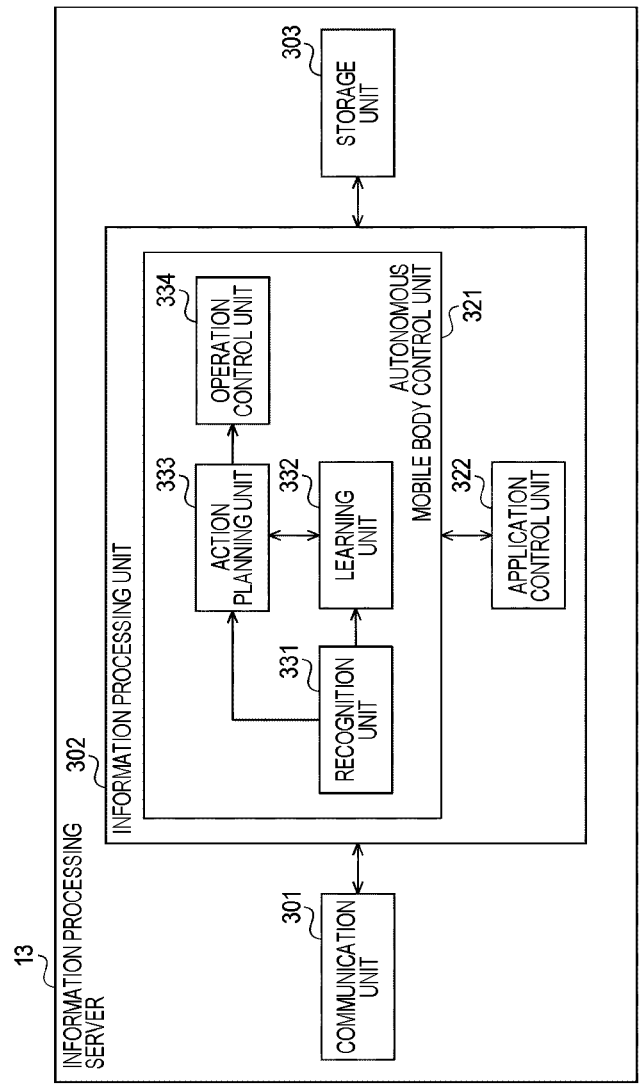
FIG. 9 is a block diagram illustrating a functional configuration example of an information processing server.

Next, a functional configuration example of the information processing server 13 will be described with reference to FIG. 9. The information processing server 13 includes a communication unit 301, an information processing unit 302, and a storage unit 303.

The communication unit 301 communicates with each autonomous mobile body 11 and each information processing terminal 12 via the network 21, and transmits and receives various data. The communication unit 301 supplies the received data to the information processing unit 302, and acquires the data to be transmitted from the information processing unit 302.

Note that, a communication method of the communication unit 301 is not particularly limited, and can be flexibly changed depending on the specifications and operation.

The information processing unit 302 includes, for example, a processor such as a CPU, performs various types of information processing, and controls each unit of the information processing terminal 12. The information processing unit 302 includes an autonomous mobile body control unit 321 and an application control unit 322.

The autonomous mobile body control unit 321 has a configuration similar to the information processing unit 103 of the autonomous mobile body 11. Specifically, the information processing unit 103 includes a recognition unit 331, a learning unit 332, an action planning unit 333, and an operation control unit 334.

Then, the autonomous mobile body control unit 321 has a function similar to the information processing unit 103 of the autonomous mobile body 11. For example, the autonomous mobile body control unit 321 receives sensor data, input data and the like, and the action history data and the like from the autonomous mobile body 11, and recognizes situations of the autonomous mobile body 11 and its surroundings. For example, the autonomous mobile body control unit 321 generates control data for controlling the operation of the autonomous mobile body 11 on the basis of the situations of the autonomous mobile body 11 and the surroundings, and transmits the control data to the autonomous mobile body 11 to control the operation of the autonomous mobile body 11. For example, the autonomous mobile body control unit 321 performs the pattern recognition learning and the learning of the action pattern corresponding to the user's discipline, similarly to the autonomous mobile body 11.

Note that, the learning unit 332 of the autonomous mobile body control unit 321 can also perform learning of collective knowledge common to a plurality of the autonomous mobile bodies 11 by performing the pattern recognition learning and the learning of the action pattern corresponding to the user's discipline on the basis of data collected from the plurality of autonomous mobile bodies 11.

The application control unit 322 communicates with the autonomous mobile body 11 and the information processing terminal 12 via the communication unit 301, and controls the application executed by the information processing terminal 12.

For example, the application control unit 322 collects various data regarding the autonomous mobile body 11 from the autonomous mobile body 11 via the communication unit 301. Then, the application control unit 322 transmits the collected data to the information processing terminal 12 via the communication unit 301, thereby causing the application executed by the information processing terminal 12 to display the data regarding the autonomous mobile body 11.

For example, the application control unit 322 receives data indicating an instruction to the autonomous mobile body 11 input via the application from the information processing terminal 12 via the communication unit 301. Then, the application control unit 322 gives an instruction from the user to the autonomous mobile body 11 by transmitting the received data to the autonomous mobile body 11 via the communication unit 301.

The storage unit 303 includes, for example, a non-volatile memory and a volatile memory, and stores various programs and data.

Note that, the functional configuration of the information processing server 13 can be flexibly changed depending on the specifications and operation.

<Processing of Information Processing System 1>

Next, processing of the information processing system 1 will be described with reference to FIGS. 10A, 10B, 11A, 11B, 12A, 12B, 13A, 13B, 14, 15A, 15B, 16, 17, 18, 19, 20, 21, 22, 23, 24, and 25.

<Pattern Recognition Learning Processing>

First, pattern recognition learning processing executed by the information processing system 1 will be described with reference to FIGS. 10A, 10B, 11A, 11B, 12A, 12B, 13A, 13B, 14, 15A, 15B, and 16.

Hereinafter, a case where the pattern recognition learning is performed by the learning unit 122 of the autonomous mobile body 11 will be described as a main example. Note that, the pattern recognition learning may be performed by, for example, the learning unit 323 of the information processing server 13, or may be performed independently or in cooperation by both the learning unit 122 and the learning unit 323.

First, an outline of pattern recognition learning based on teaching will be described with reference to FIGS. 10A and 10B. Note that, FIGS. 10A and 10B illustrate an example in which the teaching is executed by the user.

The teaching is performed by a gesture such as pointing by the user, or an utterance, for example, as illustrated in FIG. 10A. In the case of this example, the user indicates an object O1 that is a "vacuum cleaner" by a finger UH, and teaches the autonomous mobile body 11 that the object O1 is the "vacuum cleaner" by an utterance UO.

At this time, the recognition unit 121 first detects a start of the teaching on the basis of the user's utterance such as "Remember", the user's gesture indicating a start of learning by the teaching, or a sound such as snapping the user's fingers. Furthermore, at this time, the operation control unit 124 may cause the autonomous mobile body 11 to perform an operation indicating that learning based on the teaching is started. For example, the operation control unit 124 may cause the autonomous mobile body 11 to bark, raise the ears or the tail, or change the color of the irises expressed by the displays 51. Furthermore, in a case where the autonomous mobile body 11 communicates with the user by using a language, it is also possible to cause the output unit 105 to output a voice to the effect that the learning is disclosed.

Next, the operation control unit 124 controls the drive unit 104 to change a position and a posture of the autonomous mobile body 11 so that a user's finger UF and the object O1 indicated by the finger UF are within a field of view FV.

Subsequently, the recognition unit 121 specifies the object O1 as a learning target on the basis of a direction indicated by the user's finger UF. Furthermore, the operation control unit 124 causes the input unit 101 to capture an image of the object O1 specified as the learning target by the recognition unit 121.

Furthermore, the recognition unit 121 extracts a noun phrase "vacuum cleaner" used as a label by performing morphological analysis on the user's utterance UO.

Subsequently, the learning unit 122 associates the label extracted as described above with the captured image of the learning target to obtain learning data, and executes object recognition learning related to the object O1.

As described above, according to the autonomous mobile body 11, it is possible to automatically collect learning data related to various objects in daily life and perform object recognition learning based on the learning data without preparing learning data in advance.

Furthermore, according to the above-described function of the autonomous mobile body 11, by repeatedly executing the learning based on the teaching, or using the collective knowledge learned by the information processing server 13, it is possible to recognize an object O2 whose shape (characteristic) is different from that of the object O1 as "vacuum cleaner", for example, as illustrated in FIG. 10B. As a result, for example, even in a case where the user purchases a new vacuum cleaner for replacement, the autonomous mobile body 11 can flexibly respond without performing learning again from scratch.

Note that, in FIGS. 10A and 10B, the object recognition learning is mentioned as an example of the pattern recognition learning, but the pattern recognition learning is not limited to such an example. The pattern recognition learning includes, for example, motion recognition learning. That is, the learning target may be a motion of an object.

FIGS. 11A and 11B are diagrams illustrating an outline of motion recognition learning based on teaching. In the example illustrated in FIGS. 11A and 11B, a case is illustrated where the user teaches the autonomous mobile body 11 a motion of "jump" performed by a person.

Specifically, as illustrated in FIG. 11A, the user performs an utterance UO for teaching that a motion performed by a person P1 is "jump" while indicating the person P1 performing the "jump" with the finger UH.

At this time, the recognition unit 121 may detect that the user teaches the motion performed by the person P1 instead of the object recognition (or user recognition) related to the person P1 by recognizing a phrase "motion" included in the utterance UO. Furthermore, the recognition unit 121 may detect the teaching related to the motion recognition on the basis of an utterance such as "Remember the motion" uttered by the user.

Subsequently, the recognition unit 121 specifies the motion performed by the person P1 as a learning target on the basis of a direction indicated by the user's finger UF. Furthermore, the operation control unit 124 causes the input unit 101 to capture an image of the motion of the person P1 specified as the learning target by the recognition unit 121.

Furthermore, the recognition unit 121 extracts a noun phrase "jump" used as a label by performing morphological analysis on the user's utterance UO.

Subsequently, the learning unit 122 associates the label extracted as described above with the captured image of the learning target to obtain learning data, and executes motion recognition learning related to the motion performed by the person P1.

As described above, according to the autonomous mobile body 11, it is possible to automatically collect learning data related to various motions performed by the object in addition to the object itself, and perform motion recognition learning based on the learning data.

Note that, in the above, a case has been described where the image of the motion is used as the learning data, as an example; however, the learning unit 122 may use, for example, motion data collected by the information processing terminal 12 worn by the person performing the motion as the learning data.

According to the above-described function of the autonomous mobile body 11, by repeatedly executing the learning based on the teaching, or using the collective knowledge learned by the information processing server 13, it is also possible to recognize "jump" or the like performed by a person P2 different from the person P1 with high accuracy, as illustrated in FIG. 11B.

Furthermore, the pattern recognition learning may include, for example, spatial area recognition learning. That is, the learning target may be any spatial area. Here, the spatial area may be any predetermined area (place) in the space. Note that, the spatial area does not necessarily have to be a closed space physically separated from other spatial areas. The spatial area may be, for example, a "house" or the "first floor" of the "house". Furthermore, the spatial area may be a "living room" on the "first floor" or a "near a sofa" in the "living room".

FIGS. 12A and 12B are diagrams illustrating an outline of spatial area recognition learning based on teaching. In the example illustrated in FIGS. 12A and 12B, a case is illustrated where the user teaches the autonomous mobile body 11 a spatial area D1 that is an "entrance".

Specifically, as illustrated in FIG. 12A, the user performs an utterance UO that teaches that the spatial area D1 in which the autonomous mobile body 11 is located is the "entrance".

At this time, the recognition unit 121 may detect that teaching related to the spatial area D1 is being performed, by recognizing a phrase "here" included in the utterance UO. Furthermore, the recognition unit 121 may detect the teaching related to the spatial area recognition on the basis of an utterance such as "Remember the place" uttered by the user.

Subsequently, the recognition unit 121 specifies the spatial area D1 in which the autonomous mobile body 11 is currently located as a learning target on the basis of the user's utterance UO. Furthermore, the operation control unit 124 causes the input unit 101 to capture an image of the spatial area specified as the learning target by the recognition unit 121.

Furthermore, the recognition unit 121 extracts a noun phrase "entrance" used as a label by performing morphological analysis on the user's utterance UO.

Subsequently, the learning unit 122 associates the label extracted as described above with the captured image of the learning target to obtain learning data, and executes spatial area recognition learning related to the "entrance".

As described above, according to the autonomous mobile body 11, it is possible to automatically collect learning data related to various spatial areas in addition to objects and motions, and perform spatial area recognition learning based on the learning data.

Note that, in the above, a case has been described where the image of the spatial area is used as the learning data, as an example; however, the learning unit 122 may use, as a feature of the spatial area to be learned, for example, a fact that the user who is being tracked in the spatial area D1 often disappears (that is, goes out), or a fact that utterances such as "I'm home" and "See you" are often detected in the spatial area D1.

According to the above-described function of the autonomous mobile body 11, by repeatedly executing the learning based on the teaching, or using the collective knowledge learned by the information processing server 13, it is possible to recognize a spatial area D2 with a different taste from that of the spatial area D1, as the "entrance", as illustrated in FIG. 12B.

Here, as described above, the operation control unit 124 has a function of causing the input unit 101 to capture an image of the learning target specified by the recognition unit 121.

At this time, the operation control unit 124 may control the input unit 101 and the drive unit 104 so that the pattern recognition is performed with high accuracy and efficiency. For example, the operation control unit 124 can change the position and posture of the autonomous mobile body 11 so that an image of the entire specified object is correctly captured by controlling the drive unit 104.

As a result, efficient pattern recognition learning can be performed on the basis of an image captured at an appropriate distance from the learning target.

Furthermore, the operation control unit 124 may control the drive unit 104 and the input unit 101 so that an image of the learning target specified by the recognition unit 121 is captured from a plurality of angles.

As a result, features of the learning target can be extracted from various angles as compared with a case where learning is performed based on an image of one aspect of the learning target, and a learning effect with high generalization can be obtained.

Figure 13A:
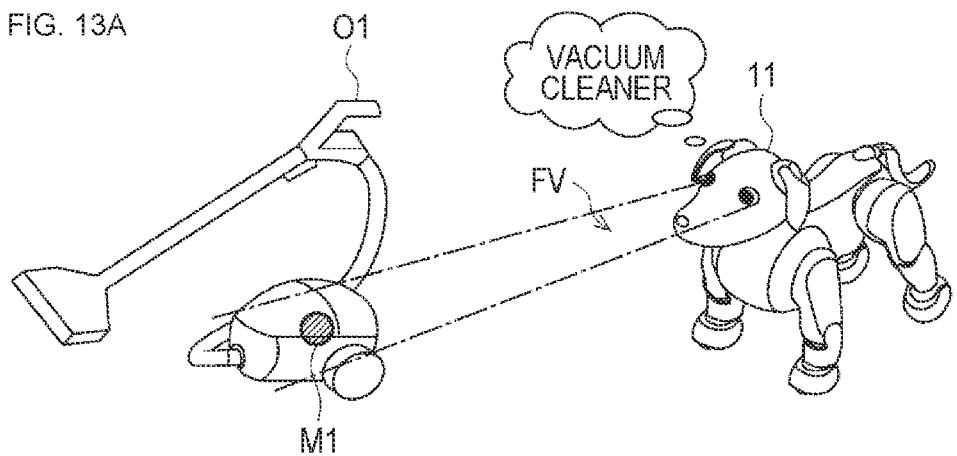
FIGS. 13A and 13B are diagrams for explaining teaching using a marker.
Figure 13B:
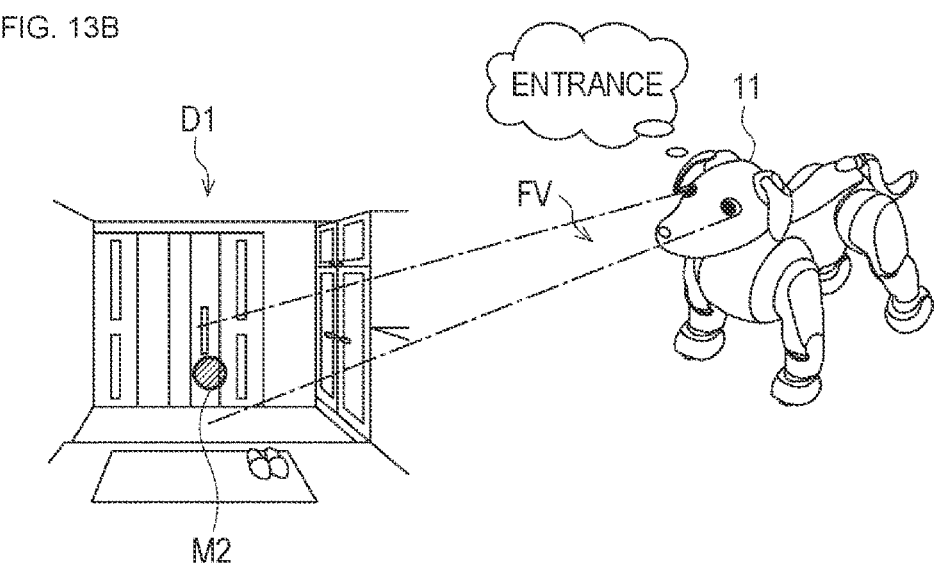

Furthermore, for example, the teaching may be implemented by a marker such as a QR code (registered trademark) attached to the learning target. FIGS. 13A and 13B are diagrams for explaining teaching using a marker.

For example, FIG. 13A illustrates an example in which teaching related to the object recognition learning is implemented with a marker M1 attached to the object O1 that is the "vacuum cleaner". In this case, the recognition unit 121 can acquire a label "vacuum cleaner" on the basis of an image of the marker M1 captured by the input unit 101.

Furthermore, FIG. 13B illustrates an example in which teaching related to the spatial area recognition learning is implemented with a marker M2 attached to a door installed in the spatial area D1 that is the "entrance". In this case as well, the recognition unit 121 can acquire a label "entrance" on the basis of an image of the marker M2 captured by the input unit 101.

As described above, by using the marker, it is possible to implement the teaching related to the object, the spatial area, and the like, instead of explicit teaching by the user, and it is possible to automatically enhance recognition ability of the autonomous mobile body 11.

Moreover, for example, the teaching may be performed on the basis of information transmitted from the learning target by wireless communication. FIG. 14 is a diagram for explaining teaching using wireless communication.

In the case of the example illustrated in FIG. 14, the object O1 that is the "vacuum cleaner" transmits the label "vacuum cleaner" and an image I3a and an image I3b of the object O1 to the autonomous mobile body 11 by wireless communication. At this time, the learning unit 122 can perform object recognition learning related to the object O1 on the basis of the received label "vacuum cleaner", the image I3a, and the image I3b.

According to the teaching using wireless communication as described above, for example, as illustrated in the figure, even if the object O3 that is a learning target is stored in a closet and an image of the object O3 cannot be captured, by transmitting an image prepared in advance to the autonomous mobile body 11 together with the label, it is possible for the autonomous mobile body 11 to perform object recognition learning related to the object O3.

For wireless communication, for example, Near Field Communication (NFC), Bluetooth (registered trademark), Radio Frequency Identification (RFID), beacon, and the like are used.

Figure 15A:
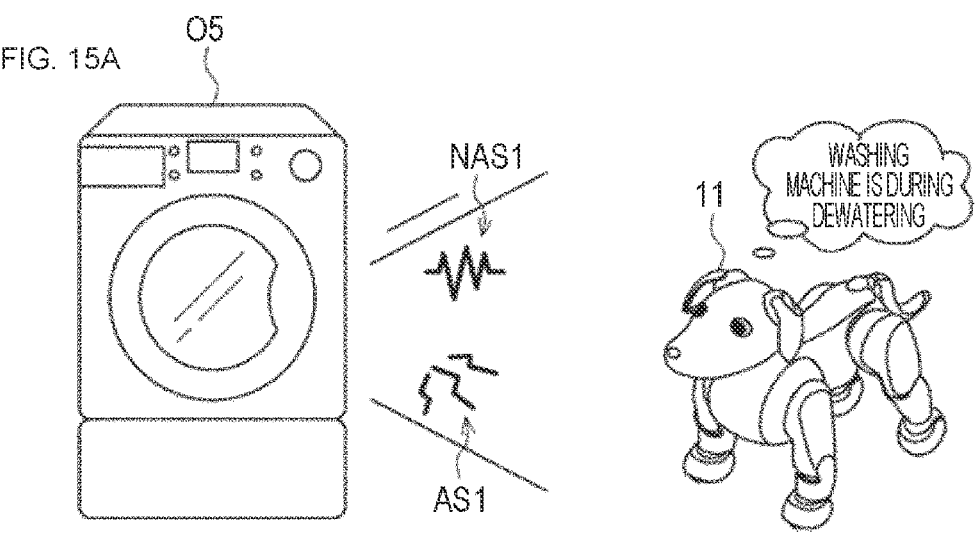
FIGS. 15A and 15B are diagrams for explaining teaching using an inaudible sound.
Figure 15B:
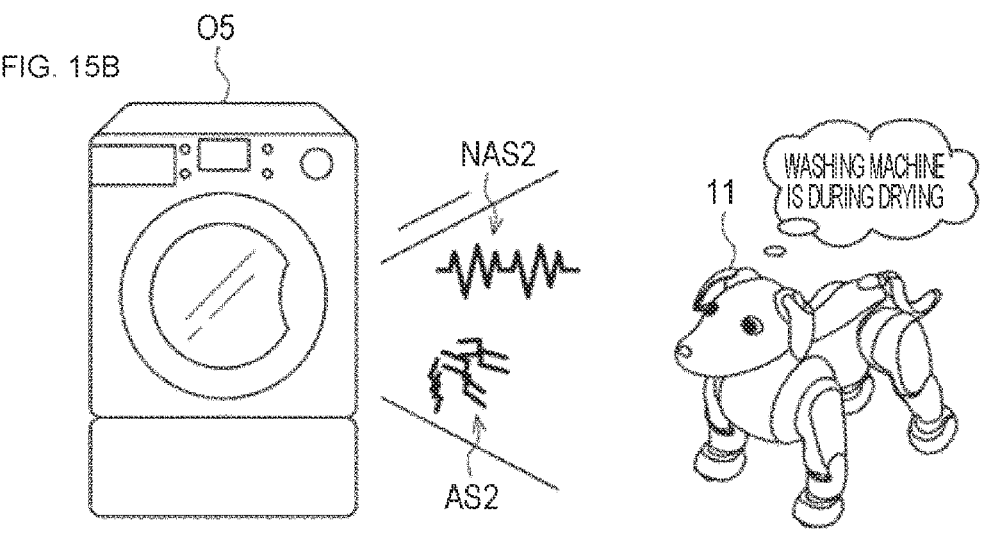

Furthermore, for example, the teaching may be implemented by an inaudible sound such as an ultrasonic wave emitted by a learning target. FIGS. 15A and 15B are diagrams for explaining teaching using the inaudible sound.

In the example illustrated in FIGS. 15A and 15B, an example is illustrated in which an object O5 that is a "washing machine" emits a predetermined inaudible sound during operation, whereby the teaching is implemented. For example, FIG. 15A illustrates an example of a case where the recognition unit 121 detects that the object O5 is the "washing machine" and the object O5 is "during dewatering", on the basis of an inaudible sound NAS1 emitted by the object O5 "during dewatering".

For example, FIG. 15B illustrates an example of a case where the recognition unit 121 detects that the object O5 is the "washing machine" and the object O5 is "during drying", on the basis of an inaudible sound NAS2 emitted by the object O5 "during drying".

As described above, according to the teaching using the inaudible sound, it is possible to teach not only a name of an object but also an operating state and the like. Furthermore, according to the teaching using the inaudible sound, for example, the learning unit 122 can also learn an audible sound AS1 that is an operation sound emitted by the object O5 "during dewatering" and an audible sound AS2 that is an operation sound emitted by the object O5 "during drying", together with an operating state of the object O5. By repeatedly executing the learning as described above, the autonomous mobile body 11 can gradually acquire the recognition ability even for an object that does not emit an inaudible sound.

Next, correction of association between the label and the learning target will be described. As described above, the autonomous mobile body 11 can perform pattern recognition learning on the basis of various types of teaching.

However, for example, when learning is performed on the basis of teaching by the user, a situation is assumed where the learning target or the label is erroneously acquired. For this reason, the application control unit 322 of the information processing server 13 may provide the information processing terminal 12 with a user interface for the user (or a developer or a service provider) to correct the association between the label and the learning target.

Furthermore, the correction of a learning result may be automatically performed by the autonomous mobile body 11. For example, by comparing the learning result accumulated in the information processing server 13 with the learning result of the autonomous mobile body 11, the learning unit 122 can also detect a discrepancy between the collective knowledge and learning knowledge of the autonomous mobile body 11, and automatically correct the label and the learning target.

Moreover, for example, the operation control unit 124 may cause the autonomous mobile body 11 to perform a guiding operation for guiding the teaching by the user to collect learning data more effectively.

For example, in a case where the recognition unit 121 detects an unknown object that cannot be recognized during an autonomous action of the autonomous mobile body 11, the operation control unit 124 can cause the autonomous mobile body 11 to perform a guiding operation for guiding the user's teaching for the unknown object. For example, the operation control unit 124 causes the autonomous mobile body 11 to perform a barking operation to the unknown object as the guiding operation.

As described above, with the guiding operation, it is possible to increase a possibility that the user performs the teaching for the unknown object with respect to an action of the autonomous mobile body 11, and an effect is expected of collecting learning data more efficiently.

Note that, examples of the guiding operation include various operations such as barking, smelling, intimidating, tilting the head, alternately looking at the user and a target, and being frightened.

Figure 16:
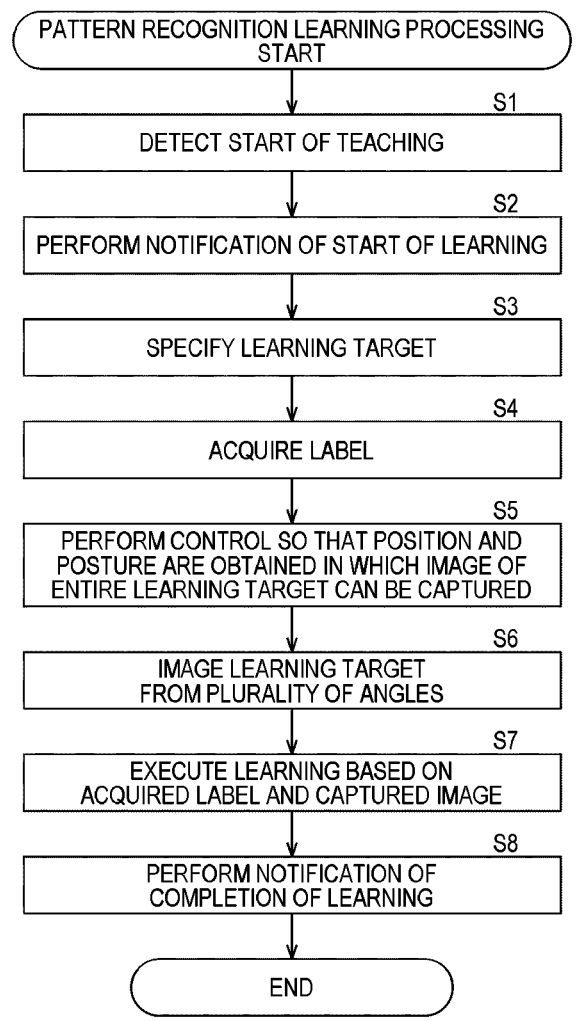
FIG. 16 is a flowchart for explaining pattern recognition learning processing executed by the autonomous mobile body.

Next, a flow of the pattern recognition learning processing of the autonomous mobile body 11 described above will be described with reference to a flowchart of FIG. 16.

In step S1, the recognition unit 121 detects a start of teaching. The recognition unit 121 detects the start of teaching on the basis of, for example, an utterance by the user, detection of a QR code (registered trademark), reception of information by wireless communication, detection of an inaudible sound, or the like.

In step S2, the operation control unit 124 performs notification of a start of learning. For example, the operation control unit 124 causes the autonomous mobile body 11 to perform an operation indicating that pattern recognition learning is started. For example, the operation control unit 124 causes the autonomous mobile body 11 to perform operations such as barking, moving the ears and the tail, and changing the color of the iris.

In step S3, the recognition unit 121 specifies a learning target. The recognition unit 121 may specify the learning target on the basis of a gesture such as pointing by the user, for example, or may specify the learning target on the basis of information acquired from the learning target.

In step S4, the recognition unit 121 acquires a label. For example, the recognition unit 121 may extract the label from the user's utterance, or may acquire the label from the information acquired from the learning target.

In step S5, the operation control unit 124 controls the drive unit 104 so that a position and a posture are obtained in which an image of the entire learning target specified in step S3 can be captured.

In step S6, the operation control unit 124 controls the drive unit 104 and the input unit 101 so that an image of the learning target is captured from a plurality of angles.

In step S7, the learning unit 122 executes the pattern recognition learning based on the label acquired in the processing of step S4 and the image captured in the processing of step S6.

In step S8, the operation control unit 124 performs notification of completion of learning. For example, the operation control unit 124 causes the autonomous mobile body 11 to perform an operation indicating the completion of the pattern recognition learning. The operation may be, for example, barking, moving the ears or the tail, changing the color of the iris, or the like.

Thereafter, the pattern recognition learning processing ends.

As described above, the autonomous mobile body 11 can improve the recognition ability to recognize an object, a motion, a spatial area, and the like by performing the pattern recognition learning.

<Discipline Response Processing for Autonomous Mobile Body 11>

Next, discipline response processing executed by the information processing system 1 will be described with reference to FIGS. 17 to 25.

The discipline response processing is processing in which the autonomous mobile body 11 changes its action in response to discipline by the user.

Here, as a target to be recognized or stored by the autonomous mobile body 11 in the discipline response processing, for example, a situation in which the autonomous mobile body 11 is placed described above is assumed. Note that, a person to be recognized or stored by the autonomous mobile body 11 is assumed to be, for example, the user of the autonomous mobile body 11, a user of another autonomous mobile body 11, a stranger, or the like. The user of the autonomous mobile body 11 includes, for example, an owner of the autonomous mobile body 11, the owner's family, relatives, and the like. Furthermore, autonomous mobile bodies such as targets to be recognized or stored by the autonomous mobile body 11 include not only an autonomous mobile body of the same type as the autonomous mobile body 11 but also autonomous mobile bodies of other types.

As how to discipline the autonomous mobile body 11, for example, a method is assumed in which the user gives an instruction by voice or gesture, gives an instruction by using an application on the information processing terminal 12, touches the autonomous mobile body 11, or gives food. Furthermore, for example, a method is assumed in which the autonomous mobile body 11 is caused to recognize the above-described target, the user's instruction, and the like from various sensors included in the input unit 101 of the autonomous mobile body 11 with use of an image, voice, or the like.

As a process in which the autonomous mobile body 11 changes by discipline, for example, a process is assumed in which a change of the autonomous mobile body 11 is completed by one discipline, the autonomous mobile body 11 gradually changes by repetition of similar discipline, or the autonomous mobile body 11 changes stepwise by discipline performed in accordance with a predetermined procedure.

As a mode of the change of the autonomous mobile body 11, it is assumed that, for example, behavior changes, a predetermined action is acquired, the predetermined action is improved (proficiency is increased in the predetermined action), or the predetermined action is stopped.

As a method of expressing the change of the autonomous mobile body 11, in addition to a method in which the autonomous mobile body changes the action, for example, a method is assumed of displaying information indicating the change of the autonomous mobile body 11 in the application on the information processing terminal 12.

Note that, hereinafter, a case where the discipline response processing is performed by the learning unit 122 of the autonomous mobile body 11 will be described as a main example. Note that, the discipline response processing may be performed by, for example, the learning unit 323 of the information processing server 13, or may be performed independently or in cooperation by both the learning unit 122 and the learning unit 323.

Furthermore, although detailed description is omitted, the above-described pattern recognition learning is appropriately performed as necessary in the discipline response processing.

<First Method of Disciplining Autonomous Mobile Body 11>

First, a first method of disciplining the autonomous mobile body 11 will be described with reference to FIGS. 17 to 20.

In the first method, the user gives an instruction to promote or suppress a predetermined action, whereby the autonomous mobile body 11 is disciplined.

Note that, a method in which the user gives an instruction is not particularly limited as long as the autonomous mobile body 11 can recognize the user's instruction. Hereinafter, a description will be given mainly with an example in which the user gives an instruction to the autonomous mobile body 11 by voice.

Furthermore, hereinafter, as a specific example, a case will be described where the autonomous mobile body 11 is disciplined to behave quietly when the user wants the autonomous mobile body 11 to be quiet.

<First Embodiment of Action Control Processing>

Here, a first embodiment of action control processing executed by the autonomous mobile body 11 will be described with reference to a flowchart of FIG. 17.

The processing is started, for example, when the power of the autonomous mobile body 11 is turned on, and ends when the power of the autonomous mobile body 11 is turned off.

In step S101, the recognition unit 121 determines whether or not an instruction is given from the user. Specifically, the recognition unit 121 performs processing of recognizing the user's instruction on the basis of the sensor data and input data supplied from the input unit 101 and the received data supplied from the communication unit 102. In a case where the recognition unit 121 does not recognize the user's instruction, the recognition unit 121 determines that no instruction is given from the user, and the processing proceeds to step S102.

In step S102, the recognition unit 121 determines whether or not it is a situation to start an action. For example, the recognition unit 121 recognizes a current situation on the basis of the sensor data and input data supplied from the input unit 101 and the received data supplied from the communication unit 102.

Furthermore, the recognition unit 121 reads, from the storage unit 106, action situation correlation data obtained by learning a correlation between each action and each situation in the processing of step S110 described later.

The action situation correlation data is one of the learning result data, and is data indicating a correlation between each action and a situation in which each action should be executed (hereinafter referred to as an action trigger situation). For example, the action situation correlation data indicates a correlation between a situation in which an instruction is given by the user and an action for which the instruction is given.

A detail of the action trigger situation can be set arbitrarily. For example, the action trigger situation includes several items of the time, time zone, day of the week, place, state of the user, state of the autonomous mobile body 11, situation around the autonomous mobile body 11, and the like in which the action should be taken.

Furthermore, types of the items included in the action trigger situation may differ depending on a detail of a corresponding action. For example, the action trigger situation in a case where the detail of the action is "be quiet" is represented by the situation around the autonomous mobile body 11, and the action trigger situation in a case where the detail of the action is "sleep" is represented by the time.

In a case where there is no action trigger situation similar to the current situation in the action situation correlation data, the recognition unit 121 determines that it is not the situation to start the action, and the processing returns to step S101.

Thereafter, the processing of steps S101 and S102 is repeatedly executed until it is determined in step S101 that the instruction is given from the user, or it is determined in step S102 that it is the situation to start the action.

On the other hand, in step S101, in a case where the recognition unit 121 recognizes the user's instruction, the recognition unit 121 determines that the instruction is given from the user, and the processing proceeds to step S103.

For example, in a case where the recognition unit 121 recognizes the user's voice prompting the autonomous mobile body 11 to be quiet, such as "Be quiet", "Shut up", or "Noisy", the recognition unit 121 determines that the instruction is given from the user, and the process proceeds to step S103.

In step S103, the recognition unit 121 recognizes the current situation on the basis of the sensor data and input data supplied from the input unit 101 and the received data supplied from the communication unit 102. That is, the recognition unit 121 recognizes a situation when the instruction is given from the user. Details of the situation to be recognized include, for example, some of the time, time zone, day of the week, place, state of the user, state of the autonomous mobile body 11, situation around the autonomous mobile body 11, and the like when the instruction is given.

The recognition unit 121 supplies data indicating a detail of the user's instruction to the action planning unit 123. Furthermore, the recognition unit 121 supplies, to the learning unit 122, data indicating the detail of the user's instruction and the situation when the instruction is given.

In step S104, the action planning unit 123 sets the action detail on the basis of the number of times of action taken in the past in accordance with the user's instruction.

Specifically, the action planning unit 123 specifies the number of times of action (hereinafter, referred to as the number of times of instruction action) taken in the past in accordance with the instruction of a similar detail on the basis of the action history data stored in the storage unit 106. Note that, the number of times of instruction action is, for example, the number of times the action for which the instruction is given is executed to the end and completed, and does not include the number of times the action for which the instruction is given is stopped in the middle and not completed.

The action planning unit 123 sets the action detail on the basis of the specified number of times of instruction action. For example, the action planning unit 123 sets the action detail so that as the number of times of instruction action increases, a state of being proficient in the action for which the instruction is given can be expressed.

Specifically, in a case where the number of times of instruction action is 0 times, for example, in a case where the autonomous mobile body 11 is not instructed to be quiet in the past and is instructed for the first time this time, the action detail is set to a pattern of sitting in a restless state for 1 minute.

For example, in a case where the number of times of instruction action is 1 to 10 times, the action detail is set to a pattern of sitting for the number of times of instruction action×1 minutes and then sitting in a restless state for 1 minute.

For example, in a case where the number of times of instruction action is 11 to 20 times, the action detail is set to a pattern of sitting for 10 minutes, lying down for (the number of times of instruction action−10)×1 minutes, and then sitting in a restless state for 1 minute.

For example, in a case where the number of times of instruction action is 21 to 30 times, the action detail is set to a pattern of sitting for 10 minutes, lying down for 10 minutes, sleeping for (the number of times of instruction action−20)×1 minutes, and then sitting in a restless state for 1 minute.

For example, in a case where the number of times of instruction action is 31 times or more, the action detail is set to a pattern of sitting for 10 minutes, lying down for 10 minutes, sleeping for 10 minutes, and then sitting in a restless state for 1 minute.

As the instruction for the predetermined action is repeated in this way, the detail of the predetermined action changes. In the case of this example, as the number of times of instruction action increases, a proficiency level for the action to be quiet (hereinafter referred to as a silent action) of the autonomous mobile body 11 improves. That is, the time during which the autonomous mobile body 11 can stand by quietly becomes longer. As a result, the user can feel the growth of the autonomous mobile body 11.

The action planning unit 123 supplies data indicating the set action detail to the operation control unit 124.

Thereafter, the processing proceeds to step S106.

On the other hand, in step S102, in a case where there is an action trigger situation similar to the current situation in the action situation correlation data, the recognition unit 121 determines that it is the situation to start the action, and the processing proceeds to step S105.

For example, in a case where an instruction to be quiet is repeatedly given when the user is at a desk to the autonomous mobile body 11 in the past, a situation in which the user is at the desk is associated with the silent action, as an action trigger situation. In this case, in a case where the user is currently at the desk, it is determined that it is the situation to start the action, and the processing proceeds to step S105.

For example, in a case where an instruction to be quiet is repeatedly given at the same time zone to the autonomous mobile body 11 in the past, the time zone is associated with the silent action, as an action trigger situation. In this case, in a case where a current time is included in that time zone, it is determined that it is the situation to start the action, and the processing proceeds to step S105.

In step S105, the autonomous mobile body 11 sets the action detail on the basis of the current situation.

Specifically, the recognition unit 121 notifies the action planning unit 123 of the action trigger situation determined to be similar to the current situation. Furthermore, the recognition unit 121 supplies data indicating the recognized current situation to the learning unit 122.

The action planning unit 123 sets the action detail on the basis of the action trigger situation of which the notification is performed and the action situation correlation data stored in the storage unit 106. That is, an action detail associated with the action trigger situation of which the notification is performed in the action situation correlation data is set as the action detail to be executed by the autonomous mobile body 11. The action planning unit 123 supplies data indicating the set action detail to the operation control unit 124.

Thereafter, the processing proceeds to step S106.

In step S106, the autonomous mobile body 11 starts the action. Specifically, the operation control unit 124 starts processing of controlling the drive unit 104 and the output unit 105 to execute the set action detail.

In step S107, the operation control unit 124 determines whether or not the action is completed. In a case where the action set in the processing of step S104 or step S105 is still being executed, the operation control unit 124 determines that the action is not completed yet, and the processing proceeds to step S108.

In step S108, the action planning unit 123 determines whether or not to stop the action. For example, the recognition unit 121 performs processing of recognizing the user's instruction on the basis of the sensor data and input data supplied from the input unit 101 and the received data supplied from the communication unit 102. Then, in a case where the recognition unit 121 does not recognize an instruction that triggers to stop the action currently being executed, the action planning unit 123 determines not to stop the action, and the processing returns to step S107.

Thereafter, the processing of steps S107 and S108 is repeatedly executed until it is determined in step S107 that the action is completed, or it is determined in step S108 to stop the action.

On the other hand, in a case where it is determined in step S107 that the action is completed, the processing proceeds to step S110.

Furthermore, in step S108, for example, in a case where it is recognized that the instruction that triggers to stop the action currently being executed, the recognition unit 121 notifies the action planning unit 123 that the instruction that triggers to stop the action currently being executed is recognized. Then, the action planning unit 123 determines to stop the action, and the processing proceeds to step S110.

As the instruction that triggers to stop the action, for example, an instruction for suppressing the action being executed, an instruction for another action different from the action being executed, and the like are assumed.

For example, in a case where the autonomous mobile body 11 is performing a silent action, in a case where the user calls the name of the autonomous mobile body 11 or gives an instruction such as "Come here" or "You may move", it is determined to stop the action, and the processing proceeds to step S110.

In step S110, the autonomous mobile body 11 stops the action. Specifically, the recognition unit 121 supplies data indicating a detail of the instruction that triggers to stop the action to the action planning unit 123. The action planning unit 123 instructs the operation control unit 124 to stop the action. The operation control unit 124 controls the drive unit 104 and the output unit 105 to cause the autonomous mobile body 11 to stop the action currently being executed.

Thereafter, the processing proceeds to step S110.

In step S110, the learning unit 122 learns a correlation between the action and the situation.

Specifically, the action planning unit 123 supplies the executed action detail and data indicating whether or not the action is completed to the learning unit 122.

The learning unit 122 adds a result of the action of this time to the action history data stored in the storage unit 106.

Furthermore, the learning unit 122 updates the action situation correlation data by learning the correlation between each action and the situation on the basis of the action history data. For example, the learning unit 122 calculates a degree of correlation (for example, a correlation coefficient) between each action and each situation.

Note that, for example, in a case where a certain action is completed, the degree of correlation between the action and a situation when the action is performed is made large. On the other hand, for example, in a case where a certain action is stopped in the middle, the degree of correlation between the action and a situation when the action is performed is made small.

Then, the learning unit 122 associates a situation in which the degree of correlation is greater than or equal to a predetermined threshold value with each action, as an action trigger situation.

Thus, for example, in a case where the user repeatedly gives a similar instruction in a similar situation in the past, the situation is associated with an action corresponding to the instruction, as an action trigger situation.

For example, in a situation in which the user is at the desk, in a case where the user repeatedly gives an instruction "Be quiet" to the autonomous mobile body 11, the situation in which the user is at the desk is associated with the silent action, as a trigger situation.

For example, in a case where the user repeatedly gives an instruction "Be quiet" to the autonomous mobile body 11 in a similar time zone, the time zone is associated with the silent action, as a trigger situation.

On the other hand, the action trigger situation is not associated with an action for which there is no situation in which the degree of correlation is greater than or equal to the threshold value.

The learning unit 122 stores the updated action situation correlation data in the storage unit 106.

Thereafter, the processing returns to step S101, and the processing after step S101 is executed.

As described above, the user can experience the discipline for the autonomous mobile body 11. As a result, for example, the user can feel that the autonomous mobile body 11 grows due to the user's discipline, and the user experience is improved.

Furthermore, the autonomous mobile body 11 comes to be able to voluntarily execute an appropriate action under an appropriate situation without the user's instruction by learning the situation when the instruction is given from the user.

Note that, for example, the autonomous mobile body 11 can estimate a time series transition of the user's expected value for the action for which the instruction is given on the basis of a distribution of time at which the instruction is given from the user, or the like, and can change the action on the basis of the estimated expected value.

Here, with reference to FIGS. 18 to 20, a specific example will be described of processing of changing the action of the autonomous mobile body 11 on the basis of the user's expected value.

Note that, hereinafter, an example will be described of a case where the autonomous mobile body 11 performs a silent action in accordance with the user's instruction. Furthermore, expected value calculation processing described below is executed by the expected value calculation unit 151 of FIG. 7.

Figure 18:
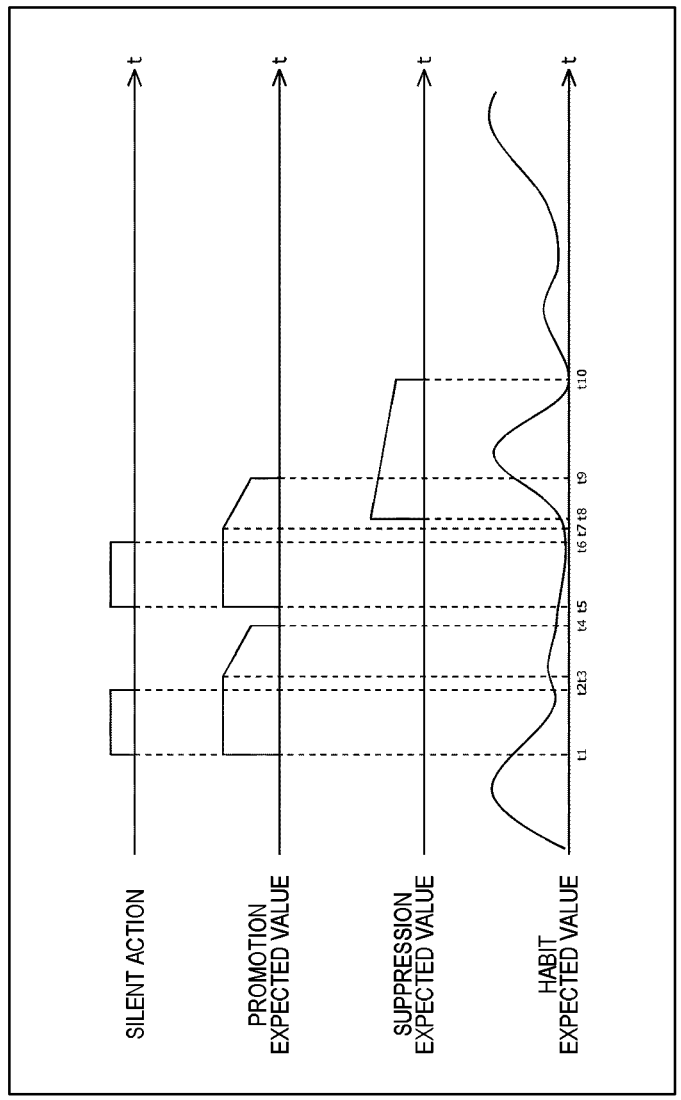
FIG. 18 is a graph illustrating an example of time series transitions of a promotion expected value, a suppression expected value, and a habit expected value.

FIG. 18 illustrates an example of time series changes of the silent action, promotion expected value, suppression expected value, and habit expected value of the autonomous mobile body 11.

At time t1, the user gives an instruction for the silent action. For example, the user calls out "Be quiet" to the autonomous mobile body 11. As a result, the autonomous mobile body 11 starts the silent action. Furthermore, the promotion expected value rises from 0 to 1.0 and is held until time t3.

At time t2, the autonomous mobile body 11 ends the silent action. Note that, as described above, the length of the silent action period between the time t1 and the time t2 changes depending on the number of times of instruction action for the past silent action.

At the time t3, the promotion expected value begins to decrease. The promotion expected value decreases linearly.

Note that, the length between the time t1 and the time t3, that is, the length of a period during which the promotion expected value is held at 1.0 may be constant, or may change depending on the number of times of instruction action for the past silent action. In the latter case, the period becomes longer as the number of times of instruction action for the silent actions increases.

At time t4, the promotion expected value reaches 0.5 and then is lowered to 0.

At time t5, the user gives an instruction for the silent action as at the time t1. As a result, the autonomous mobile body 11 starts the silent action, the promotion expected value rises from 0 to 1.0, and is held until time t7.

At time t6, the autonomous mobile body 11 ends the silent action as at the time t2.

At the time t7, the promotion expected value begins to decrease as at the time t3.

At time t8, the user gives an instruction to suppress silent action. For example, the user calls the name of the autonomous mobile body 11. As a result, the suppression expected value rises from 0 to 1.0 and then begins to decrease. The suppression expected value decreases linearly.

At time t9, the promotion expected value reaches 0.5 and then is lowered to 0 as at the time t4.

At time t10, the suppression expected value reaches 0.5 and then is lowered to 0.

Note that, the habit expected value changes on the basis of a result calculated by a method described later.

Figure 19:
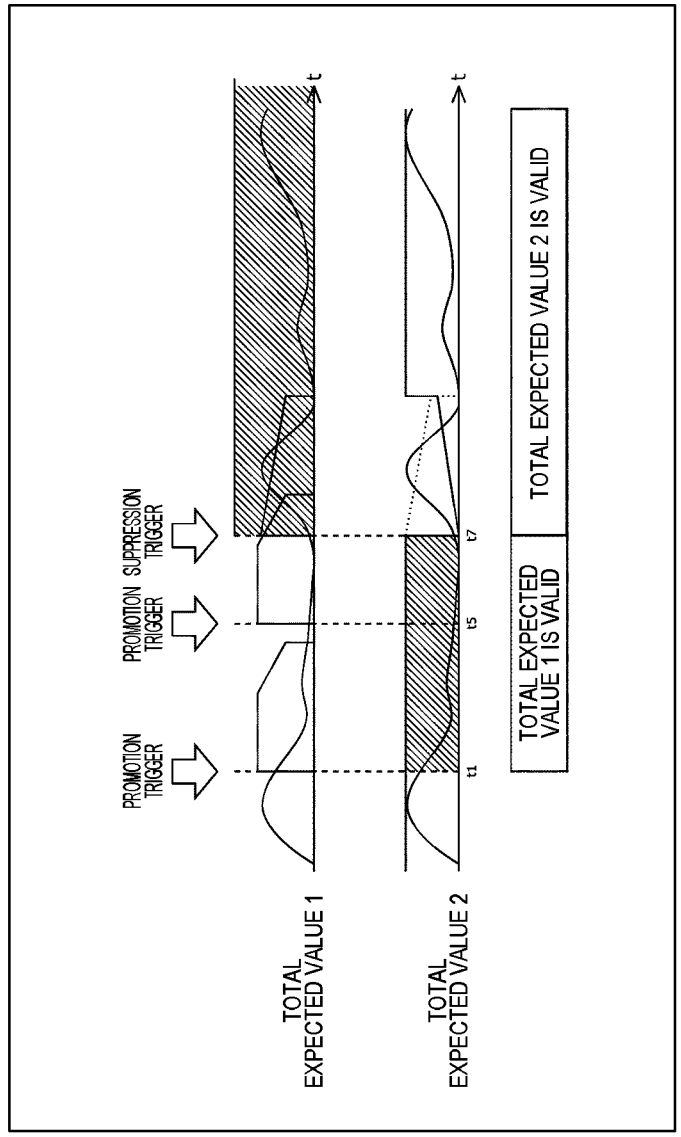
FIG. 19 is a graph illustrating an example of time series transitions of total expected values over time.

FIG. 19 is a graph for explaining a method of calculating the total expected value in a case where the promotion expected value, the suppression expected value, and the habit expected value change as illustrated in FIG. 18.

At the time t1, the instruction for the silent action given from the user serves as a promotion trigger, and a total expected value 1 is valid. Note that, the total expected value 1 is set to a larger value of the promotion expected value and the habit expected value.

At the time t5, the instruction for the silent action given from the user serves as the promotion trigger. However, since the total expected value 1 is already made valid at the time t1, the total expected value 1 remains to be made valid.

At the time t7, the instruction to suppress the silent action given from the user serves as a suppression trigger, the total expected value 1 is invalid, and a total expected value 2 is valid. The total expected value 2 is set to a smaller value of (1.0–the suppression expected value) and the habit expected value.

Thus, in a period from the time t1 to the time t7, the autonomous mobile body 11 acts on the basis of the total expected value 1. For example, in a case where the total expected value 1 is greater than or equal to a predetermined threshold value, the autonomous mobile body 11 performs an action similar to the silent action and operates as quiet as possible, except for a period during which the silent action is executed (a period from the time t1 to the time t2, and a period from the time t5 to the time t6). For example, the autonomous mobile body 11 limits a walking speed, and walks quietly. Furthermore, for example, the autonomous mobile body 11 preferentially performs a quiet operation and tries not to perform a noisy operation as much as possible. The quiet operation is, for example, an operation of operating only the front legs and neck without moving. Noisy operation is, for example, running around, or singing. On the other hand, the autonomous mobile body 11 performs a normal operation in a case where the total expected value 1 is less than the predetermined threshold value.

As a result, the autonomous mobile body 11 can operate quietly for a while even after finishing the silent action, for example, and the user can feel the afterglow of the silent action.

Furthermore, in a period after the time t7, the autonomous mobile body 11 acts on the basis of the total expected value 2. For example, in a case where the total expected value 2 is greater than or equal to a predetermined threshold value, the autonomous mobile body 11 preferentially performs a quiet operation. On the other hand, the autonomous mobile body 11 performs a normal operation in a case where the total expected value 2 is less than the predetermined threshold value.

Note that, regarding the promotion trigger and suppression trigger, the latest ones are always valid. Then, as described above, the total expected value 1 is valid during the period when the promotion trigger is valid, and the total expected value 2 is valid during the period when the suppression trigger is valid.

Here, an example of a method of calculating the habit expected value will be described with reference to FIG. 20.

Figure 20:
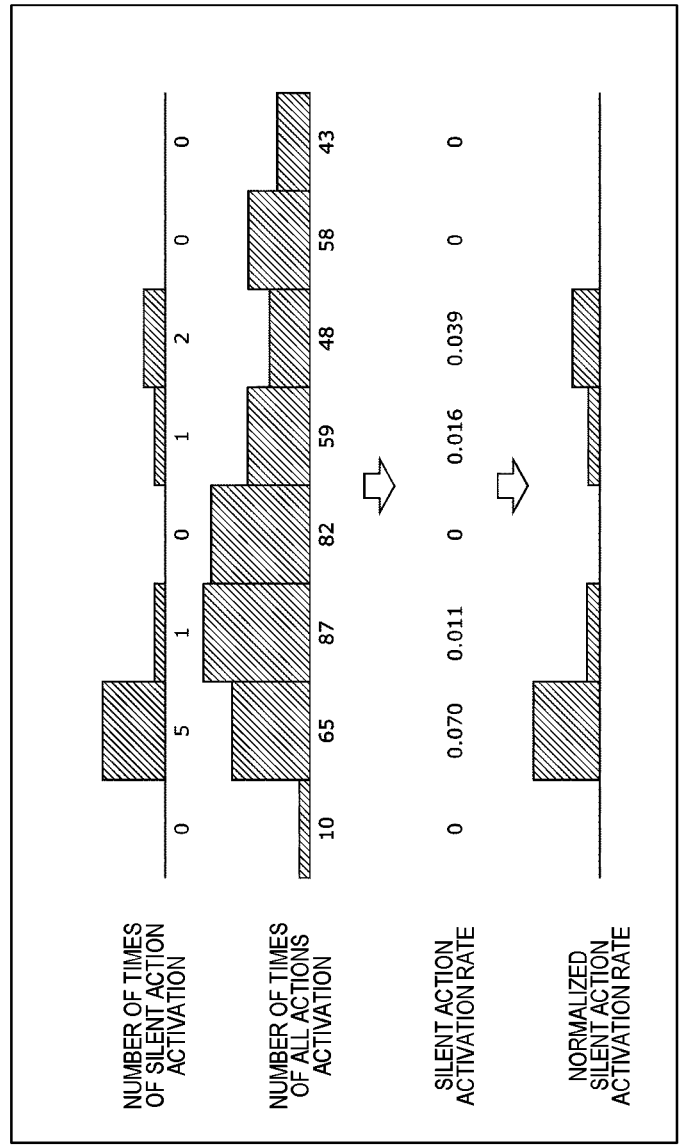
FIG. 20 is a diagram for explaining a method of calculating the habit expected value.

The top graph of FIG. 20 illustrates a histogram of the number of times of activation of the silent action for each predetermined time zone within an immediately preceding predetermined period (for example, three months). In a case where the silent action is activated even once a day in each time zone, one histogram value is added. That is, in a case where the silent action is activated even once in the same time zone on the same day, one histogram value is added regardless of the number of times of activation. Thus, for example, in a case where the histogram value is five, it indicates that the silent action is activated in the time zone, in five days within the predetermined period.

Note that, activation of a certain action means that the autonomous mobile body 11 starts the action regardless of the presence or absence of the user's instruction, and it does not matter whether or not the action is completed.

The second graph of FIG. 20 illustrates a histogram of the number of times of activation of all actions (including the silent action) for each predetermined time zone within the same period as the top graph. For example, in a case where any action is activated even once a day in each time zone, one histogram value is added. That is, in a case where any action is activated even once in the same time zone on the same day, one histogram value is added regardless of the number of times and type of the activated action. Thus, for example, in a case where the histogram value is 65, it indicates that some action is activated in the time zone, in 65 days within the predetermined period.

Then, a silent action activation rate v(t) in each time zone t is calculated by the following equation (1).

$$v(t)=s(t)/a(t) \quad (1)$$

The number of times of silent action activation in the time zone t is indicated by s(t), and the number of times of all actions activation in the time zone t is indicated by a(t).

Then, a normalized silent action activation rate vn (t) obtained by normalizing the silent action activation rate v(t) is calculated by the following equation (2).

$$vn(t)=K\times(((v(t)-\mu)/(\sigma)/2+0.5) \quad (2)$$

An average value of the number of times of silent action activation s(t) in all time zones is indicated by μ, and a variance of the number of times of silent action activation s(t) in all time zones is indicated by σ.

K indicates a coefficient, and is set as follows, for example. Note that, hereinafter, a total of the number of times of silent action activation s(t) is defined as Σs(t), and a total of the number of times of all actions activation a(t) is defined as Σa(t).

For example, in a case where Σa(t) is less than a predetermined threshold value MIN_COUNT, that is, in a case where the number of times of activation of the action of the autonomous mobile body 11 is very small, the coefficient K is set to 0.

On the other hand, in a case where Σa(t) is greater than or equal to the threshold value MIN_COUNT, K is set to 1 when a ratio (=Σs(t)/Σa(t)) is greater than or equal to a predetermined threshold value MAX_RATIO. On the other hand, in a case where the ratio is less than the threshold value MAX_RATIO, K is set to ratio/MAX_RATIO. That is, the coefficient K increases as a rate of the number of times of activation of the silent action to the number of times of activation of all actions increases.

The graph at the bottom of FIG. 20 illustrates a graph of the normalized silent action activation rate.

Then, the normalized silent action activation rate after being corrected to 0 in a case where the normalized silent action activation rate is less than 0, or the normalized silent action activation rate after being corrected to 1 in a case where the normalized silent action activation rate is greater than or equal to 1 is used as the habit expected value.

By using the habit expected value, the autonomous mobile body 11 can perform an action expected by the user (for example, acts quietly) when the user's expectation is high on a daily basis, even if the user does not give an instruction.

Note that, by the above-described processing, it is possible to discipline the autonomous mobile body 11 to cause various actions other than the silent action to be performed.

For example, the user speaks (gives an instruction) "Good night" repeatedly (for example, every day), whereby the autonomous mobile body 11 comes to be proficient in a sleeping action. Here, the sleeping action is, for example, an action in which the autonomous mobile body 11 moves to a charging stand and transitions to a standby mode on the charging stand.

For example, the autonomous mobile body 11 does not easily start the sleeping action even if the user speaks "Good night" at the beginning, but comes to start the sleeping action immediately, after repetition of speaking every day. Furthermore, the autonomous mobile body 11 comes to move quietly to the charging stand, such as walking stealthily.

Furthermore, the user speaks "Good night" repeatedly in the same time zone, whereby the autonomous mobile body 11 comes to remember the time zone and automatically start the sleeping action in the time zone.

Moreover, for example, the user speaks "Good night until morning" repeatedly, whereby the autonomous mobile body 11 comes to continue the standby mode until morning in accordance with the user's instruction.

Furthermore, for example, the user speaks (gives an instruction) "Good morning" repeatedly (for example, every day), whereby the autonomous mobile body 11 comes to be proficient in a wake-up action. Here, the wake-up action is, for example, an action in which the autonomous mobile body 11 is activated from a state in which the autonomous mobile body 11 is in the standby mode on the charging stand and starts moving.

For example, at the beginning, the autonomous mobile body 11 does not get up easily even if the user speaks "Good morning", but comes to get up immediately, after repetition of speaking every day.

Furthermore, the user speaks "Good morning" repeatedly in the same time zone, the autonomous mobile body 11 comes to remember the time zone and automatically wake up in the time zone.

Moreover, for example, the user speaks (gives an instruction) "I'm home" repeatedly when returning home, whereby the autonomous mobile body 11 comes to be proficient in an action of welcoming the user. Here, the action of welcoming is, for example, an action in which the autonomous mobile body 11 moves to the entrance and welcomes the user.

For example, at the beginning, the autonomous mobile body 11 does not move to the entrance very often even if the user opens the entrance and speaks "I'm home", but comes to move to the entrance and welcome the user when the user opens the entrance and speaks "I'm home", after repetition of speaking every day. Furthermore, for example, the autonomous mobile body 11 comes to remember the user's return time, and automatically move to the entrance and wait for the user to return home when the user's return time comes.

Furthermore, for example, the user repeatedly gives an instruction to "Wait" in a case where the autonomous mobile body 11 is about to start an operation of eating food, whereby the autonomous mobile body 11 comes to be able to wait without eating food. Furthermore, for example, the user repeatedly gives an instruction to "You may eat" when the autonomous mobile body 11 performs "Wait" for food, whereby the autonomous mobile body 11 comes to be able to perform "Wait" for hood until the user gives permission.

By a similar method, for example, the autonomous mobile body 11 can be disciplined for "Sitting" and the like.

Moreover, by a similar method, for example, the user can discipline the autonomous mobile body 11 to suppress a predetermined action by repeatedly giving an instruction to suppress the predetermined action to the autonomous mobile body 11. For example, in the above-described example, the user can discipline the autonomous mobile body 11 for the silent action by giving a negative instruction such as "Don't be noisy" instead of "Be quiet".

<Second Method of Disciplining Autonomous Mobile Body 11>

Next, a second method of disciplining the autonomous mobile body 11 will be described with reference to FIGS. 21 to 24.

In the second method, discipline is performed for a place where the autonomous mobile body 11 performs a predetermined action.

Hereinafter, as a specific example, an example will be described in which discipline is performed for a place where the autonomous mobile body 11 urinates.

<Second Embodiment of Action Control Processing>

Figure 21:
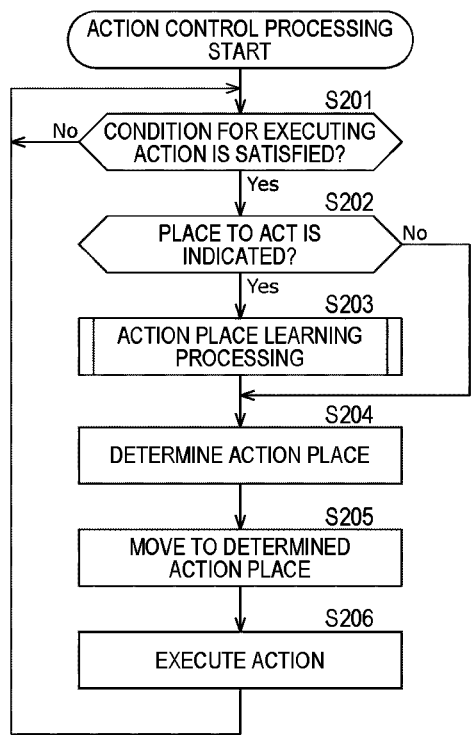
FIG. 21 is a flowchart for explaining a second embodiment of the action control processing executed by the autonomous mobile body.

Here, a second embodiment of the action control processing executed by the autonomous mobile body 11 will be described with reference to a flowchart of FIG. 21.

The processing is started, for example, when the power of the autonomous mobile body 11 is turned on, and ends when the power of the autonomous mobile body 11 is turned off.

In step S201, the autonomous mobile body 11 determines whether or not a condition for executing an action is satisfied on the basis of the sensor data and input data supplied from the input unit 101 and the received data supplied from the communication unit 102. This determination processing is repeatedly executed until it is determined that the condition for executing the action is satisfied, and in a case where it is determined that the condition for executing the action is satisfied, the processing proceeds to step S202.

For example, in a case where the recognition unit 121 recognizes an instruction such as "Pee" by the user, the recognition unit 121 determines that the condition for the action (urination) is satisfied, and the processing proceeds to step S202. Furthermore, for example, in a case where the urinary intention coefficient described later becomes greater than or equal to a predetermined threshold value, the action planning unit 123 determines that the condition for the action (urination) is satisfied, and the processing proceeds to step S202.

In step S202, the recognition unit 121 determines whether or not a place to act is indicated on the basis of the sensor data and input data supplied from the input unit 101 and the received data supplied from the communication unit 102. In a case where it is determined that the place to act is indicated, the processing proceeds to step S203.

Note that, the method of indicating the place to act is not particularly limited. For example, the user can indicate the place to urinate by moving the autonomous mobile body 11 to the place to urinate and then uttering a word to indicate the place to urinate, such as "Toilet is here". For example, the user can indicate the place to urinate by uttering a word to indicate urination and the place to urinate, such as "Pee in the corner of the room". For example, the user can indicate the place to urinate by indicating a predetermined position on a map by using the information processing terminal 12.

Furthermore, for example, the user may indicate a direction of action (for example, "right direction", "entrance direction", or the like) instead of a specific place. Moreover, for example, the user may indicate the direction of action and the specific location. Furthermore, for example, the user can indicate the place to act by calling the autonomous mobile body 11 to a place where the user is.

In step S203, the autonomous mobile body 11 performs action place learning processing.

Figure 22:
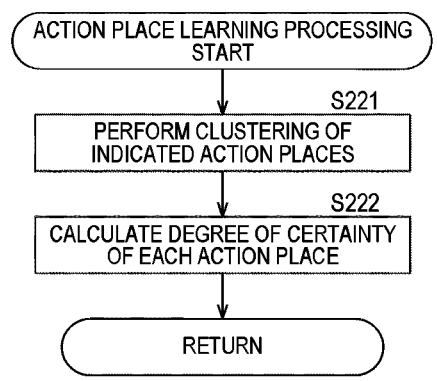
FIG. 22 is a flowchart for explaining details of action place learning processing.

Here, details of action place learning processing will be described with reference to a flowchart of FIG. 22.

In step S221, the autonomous mobile body 11 performs clustering of indicated action places. Specifically, the recognition unit 121 supplies data indicating an action detail and an indicated place (hereinafter referred to as an indicated place) to the learning unit 122.

The learning unit 122 adds data including the action detail and the indicated place of this time to the action history data stored in the storage unit 106.

Furthermore, the learning unit 122 reads, from the action history data, the latest N data (including the data of this time) among the data of the action detail similar to the action detail of this time.

Then, the learning unit 122 performs clustering of the indicated places indicated in the read data by using, for example, a clustering method such as the K-means method.

Figure 23:
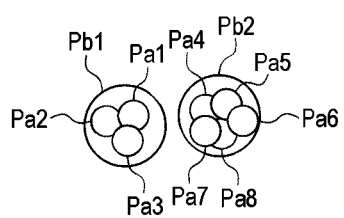
FIG. 23 is a diagram illustrating an example of clustering of indicated places.

FIG. 23 illustrates a specific example of clustering of the indicated places. In this example, an indicated place Pa1 to an indicated place Pa3 are classified into a cluster Pb1, and an indicated place Pa4 to an indicated place Pa8 are classified into a cluster Pb2. In this way, the indicated place Pa1 to the indicated place Pa3 are grouped into one action place Pb1, and the indicated place Pa4 to the indicated place Pa8 are grouped into one action place Pb2.

In step S222, the learning unit 122 calculates a degree of certainty of each action place. For example, the learning unit 122 calculates the degree of certainty of each action place on the basis of the number of indicated places included in each action place. For example, in the example of FIG. 22, since the action place Pb2 contains more indicated places than the action place Pba, the degree of certainty is set higher.

The learning unit 122 updates action place data that is one of the learning result data and stored in the storage unit 106, on the basis of the learning result of this time.

Note that, the action place data includes, for example, each action detail, and the action place and degree of certainty corresponding to each action detail.

As described above, the action place where the predetermined action is performed and the degree of certainty for each action place are set on the basis of a distribution of the indicated place in the past.

Thereafter, the action place learning processing ends.

Returning to FIG. 21, on the other hand, in a case where it is determined in step S202 that the place to act is not indicated, the processing of step S203 is skipped and the processing proceeds to step S204.

In step S204, the action planning unit 123 sets the action place.

For example, in a case where the place to act is indicated by the user, the action planning unit 123 determines the indicated place as the action place.

On the other hand, in a case where the place to act is not indicated by the user, the action planning unit 123 determines the action place on the basis of the current position of the autonomous mobile body 11 and the action place data stored in the storage unit 106.

Specifically, for example, in a case where the action place corresponding to the action detail of this time is not learned and no action place is set, the action planning unit 123 determines the current position of the autonomous mobile body 11 as the action place.

On the other hand, in a case where the action place corresponding to the action detail of this time is learned and one or more action places are set, the action planning unit 123 determines the action place on the basis of the degree of certainty of each action place and a distance to each action place. For example, in a case where the action place is set within a range of a predetermined distance, the action planning unit 123 selects the action place with the highest degree of certainty among the action places within the range of the predetermined distance. Note that, in a case where there is only one action place within the range of the predetermined distance, the one action place is selected. On the other hand, for example, in a case where the action place is not set within the range of the predetermined distance, the action planning unit 123 determines the current position of the autonomous mobile body 11 as the action place.

The action planning unit 123 supplies data indicating the action detail and the action place to the operation control unit 124.

In step S205, the autonomous mobile body 11 moves to the determined action place. Specifically, the operation control unit 124 controls the drive unit 104 to move the autonomous mobile body 11 to the determined action place.

In step S206, the autonomous mobile body 11 executes the action. Specifically, the operation control unit 124 controls the drive unit 104 and the output unit 105 to cause the autonomous mobile body 11 to execute the action set by the action planning unit 123.

Thereafter, the processing returns to step S201, and the processing after step S201 is executed.

Here, a specific example of the action control processing of FIG. 21 will be described with reference to FIG. 24.

Figure 24:
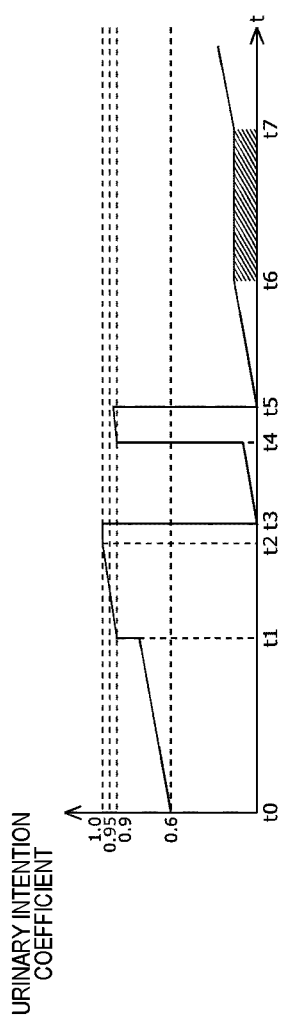
FIG. 24 is a graph illustrating an example of a time series transition of a urinary intention coefficient over time.

FIG. 24 is a graph illustrating a time series change of the urinary intention coefficient that defines a timing of urination by the autonomous mobile body 11.

At time t0, when the power of the autonomous mobile body 11 is turned on and the autonomous mobile body 11 is activated, for example, the urinary intention coefficient is set to 0.6.

Note that, the urinary intention coefficient increases linearly at a predetermined rate (for example, +0.1 in 1 hour) until the autonomous mobile body 11 performs a predetermined action (for example, urinating, eating food, transitioning to the standby mode, or the like) or the urinary intention coefficient reaches 1.0.

At time t1, when the autonomous mobile body 11 performs the operation of eating food, the urinary intention coefficient increases to 0.9. When the urinary intention coefficient is greater than or equal to 0.9, the autonomous mobile body 11 starts an operation indicating that it has a desire to urinate. For example, in a range of the urinary intention coefficient from 0.9 to 0.95, the autonomous mobile body 11 performs a restless motion. Furthermore, for example, in a range of the urinary intention coefficient from 0.95 to 1.0, the restless motion of the autonomous mobile body 11 becomes large.

When the urinary intention coefficient reaches 1.0 at time t2, the autonomous mobile body 11 determines that a condition for urinating is satisfied, and spontaneously urinates at time t3. At this time, the place to urinate is determined by the processing of step S205 of FIG. 21 described above. Furthermore, when urination is performed, the urinary intention coefficient drops to 0.

At time t4, when the autonomous mobile body 11 performs the operation of eating food, the urinary intention coefficient increases to 0.9.

At time t5, for example, in a case where the user instructs the autonomous mobile body 11 to "Pee", the autonomous mobile body 11 urinates in accordance with the instruction. At this time, the place to urinate is determined by the processing of step S205 of FIG. 21 described above. Furthermore, when urination is performed, the urinary intention coefficient drops to 0.

When the autonomous mobile body 11 transitions to the standby mode at time t6, a change in the urinary intention coefficient stops, and the urinary intention coefficient is held without increasing or decreasing during the standby mode.

At time t7, when the autonomous mobile body 11 returns from the standby mode, the urinary intention coefficient begins to rise again.

As described above, the user can perform discipline for the place where the autonomous mobile body 11 performs the predetermined action.

Note that, by the above-described processing, it is possible to perform discipline for a place where the autonomous mobile body 11 performs any action other than urination.

For example, it is possible to perform discipline for a place (for example, the entrance or the like) where the autonomous mobile body 11 welcomes the user when the user returns home.

Furthermore, by similar processing, it is possible to discipline the autonomous mobile body 11 for a place where a predetermined action is prohibited.

For example, it is possible to discipline the autonomous mobile body 11 for a place where the autonomous mobile body 11 is prohibited from approaching or entering.

Specifically, for example, in a case where the autonomous mobile body 11 repeatedly hits the same chair, the user repeats an instruction such as "It is not good here because you hits the chair", "It is not good because it is dangerous here", or the like when the autonomous mobile body 11 hits the chair, whereby the autonomous mobile body 11 learns the vicinity of the chair as a dangerous place. As a result, the autonomous mobile body 11 comes to move avoiding the vicinity of the chair gradually.

Furthermore, for example, the kitchen is a place where the user does not want the autonomous mobile body 11 to enter because the user performs cooking or washing, the floor is wet, and it is dangerous. Thus, for example, every time the autonomous mobile body 11 approaches or enters the kitchen, the user gives an instruction such as "Don't come to the kitchen". As a result, the autonomous mobile body 11 learns that the kitchen is a place where the autonomous mobile body 11 should not enter, and comes to avoid entering the kitchen gradually.

Note that, for example, it is also possible to discipline the autonomous mobile body 11 by combining the above-described first method and the second method.

For example, the user who is a housewife indicates the entrance as a place to welcome the user's master, for the autonomous mobile body 11, and repeatedly gives an instruction to "Welcome master at the entrance" at a similar time zone. As a result, the autonomous mobile body 11 gradually comes to be able to welcome the master at the entrance when it is the time zone.

For example, the user indicates a place where the autonomous mobile body 11 waits, and repeatedly gives an instruction to "Wait at the usual place" when the user wants the autonomous mobile body 11 to be quiet or when the user does not want the autonomous mobile body 11 to be near. As a result, the autonomous mobile body 11 gradually comes to be able to stand by at the indicated place. Furthermore, by learning a situation in which the instruction is given, the autonomous mobile body 11 comes to be able to voluntarily move to the indicated place and stand by when the user wants the autonomous mobile body 11 to be quiet or when the user does not want the autonomous mobile body 11 to be near.

For example, in a case where the autonomous mobile body 11 always stops at the same place, the user gives an instruction such as "You can walk because there is nothing" every time the autonomous mobile body 11 stops at that place. As a result, the autonomous mobile body 11 can learn the place as a safe place and gradually comes to be able to continue walking without stopping at the place.

<Third Method of Disciplining Autonomous Mobile Body 11>

Figure 25:
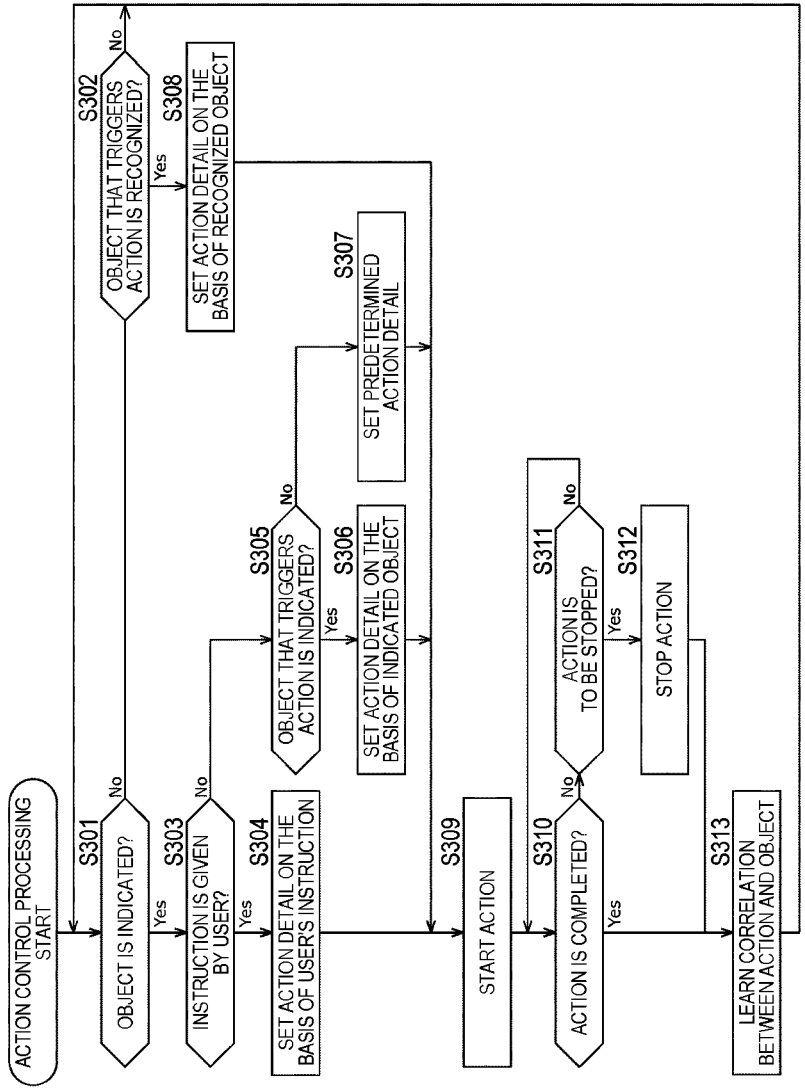
FIG. 25 is a flowchart for explaining a third embodiment of the action control processing executed by the autonomous mobile body.

Next, a third method of disciplining the autonomous mobile body 11 will be described with reference to FIG. 25.

In the third method, the autonomous mobile body 11 is disciplined to execute an action corresponding to an object when the autonomous mobile body 11 remembers the object that triggers execution of the action, that is, the object that triggers the action (hereinafter referred to as an action trigger object) and finds the object, or the like.

<Third Embodiment of Action Control Processing>

Here, a third embodiment of the action control processing executed by the autonomous mobile body 11 will be described with reference to a flowchart of FIG. 25.

The processing is started when the power of the autonomous mobile body 11 is turned on, and ends when the power of the autonomous mobile body 11 is turned off.

In step S301, the recognition unit 121 determines whether or not the object is indicated, on the basis of the sensor data supplied from the input unit 101. In a case where it is determined that the object is not indicated, the processing proceeds to step S302.

In step S302, the recognition unit 121 determines whether or not the object that triggers the action is recognized, on the basis of the sensor data supplied from the input unit 101. In a case where a new object is not recognized, the recognition unit 121 determines that the object that triggers the action is not recognized, and the processing returns to step S301.

On the other hand, in a case where a new object is recognized, the recognition unit 121 recognizes a type of the object. Furthermore, in the processing of step S313 described later, the recognition unit 121 reads, from the storage unit 106, action object correlation data obtained by learning a correlation between each action and each object.

The action object correlation data is one of the learning result data, and is data indicating a correlation between each action and an action trigger object that triggers execution of each action. For example, the action object correlation data indicates a correlation between an object indicated by the user and an action for which the instruction is given together with the indication of the object.

In a case where there is no action trigger object that matches the type of the recognized object in the action object correlation data, the recognition unit 121 determines that the object that triggers the action is not recognized, and the processing returns to step S301.

Thereafter, the processing of steps S301 and S302 is repeatedly executed until it is determined in step S301 that the object is indicated, or it is determined in step S302 that the object that triggers the action is recognized.

On the other hand, in step S301, for example, in a case where it is recognized that the user points to an object to be remembered by the autonomous mobile body 11 or presents the object in front of the autonomous mobile body 11, the recognition unit 121 determines that the object is indicated, and the processing proceeds to step S303.

Figure 17:
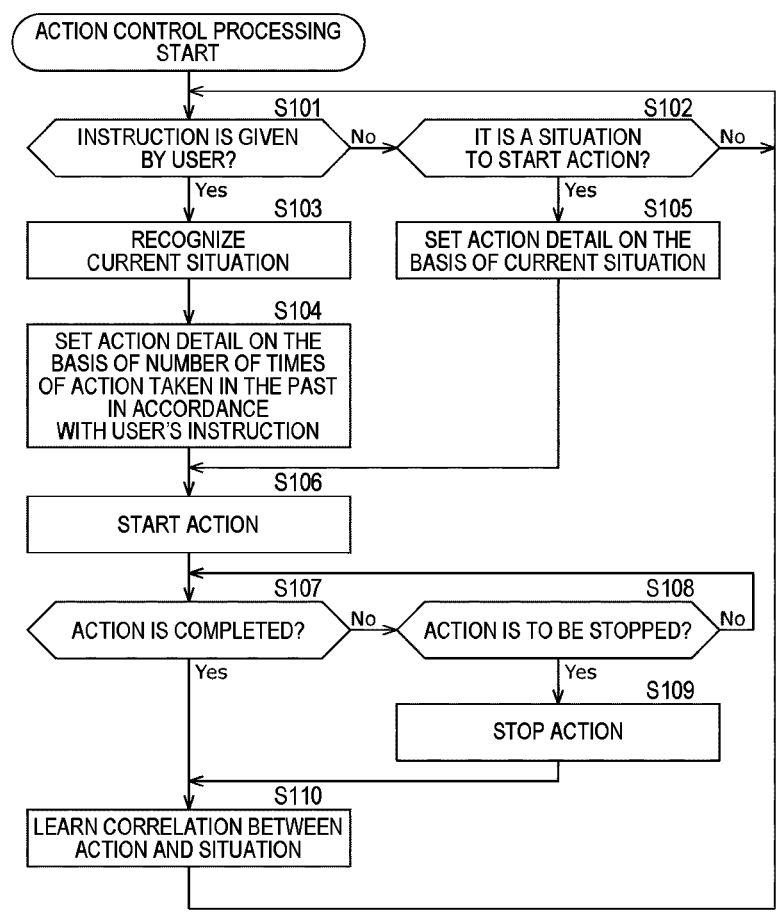
FIG. 17 is a flowchart for explaining a first embodiment of action control processing executed by the autonomous mobile body.

In step S303, it is determined whether or not an instruction is given from the user, similarly to the processing of step S103 of FIG. 17. In a case where it is determined that the instruction is given from the user, the processing proceeds to step S304.

In step S304, the action planning unit 123 sets an action detail on the basis of the user's instruction. Specifically, the recognition unit 121 supplies data indicating the type of the indicated object and the recognized detail of the user's instruction to the action planning unit 123. The action planning unit 123 sets the action detail on the basis of the type of the indicated object and the detail for which the instruction is given together with the indication of the object. The action planning unit 123 supplies data indicating the set action detail to the operation control unit 124. Furthermore, the recognition unit 121 supplies data indicating the type of the indicated object to the learning unit 122.

Thereafter, the processing proceeds to step S309.

On the other hand, in a case where it is determined in step S303 that no instruction is given from the user, the processing proceeds to step S305.

In step S305, the recognition unit 121 determines whether or not the object that triggers the action is indicated. Specifically, in a case where there is an action trigger object that matches the type of the indicated object in the action object correlation data, the recognition unit 121 determines that the object that triggers the action is indicated, and the processing proceeds to step S306.

In step S306, the action planning unit 123 sets the action detail on the basis of the indicated object. Specifically, the recognition unit 121 supplies data indicating a type of the indicated action trigger object to the learning unit 122 and the action planning unit 123.

The action planning unit 123 sets the action detail on the basis of the type of the indicated action trigger object and the action object correlation data stored in the storage unit 106. That is, an action detail associated with the indicated object (action trigger object) in the action situation correlation data is set as the action detail to be executed by the autonomous mobile body 11. The action planning unit 123 supplies data indicating the set action detail to the operation control unit 124.

Thereafter, the processing proceeds to step S309.

On the other hand, in step S305, in a case where there is no action trigger object that matches the type of the indicated object in the action object correlation data, the recognition unit 121 determines that the object that triggers the action is not indicated, and the processing proceeds to step S307.

In step S307, the action planning unit 123 sets a predetermined action detail. Specifically, the recognition unit 121 supplies data indicating that an object different from the action trigger object (hereinafter referred to as a non-action trigger object) is indicated and a type of the non-action trigger object to the action planning unit 123. Furthermore, the recognition unit 121 supplies data indicating the type of the non-action trigger object to the learning unit 122.

Here, for example, an action detail in a case where the non-action trigger object is indicated is set in advance. The action planning unit 123 supplies data indicating the action detail to the operation control unit 124.

Thereafter, the processing proceeds to step S309.

On the other hand, in step S302, in a case where there is an action trigger object that matches the type of the recognized object in the action object correlation data, the recognition unit 121 determines that the object that triggers the action is recognized, and the processing proceeds to step S308.

In step S308, the action detail is set on the basis of the recognized object by processing similar to step S306. Furthermore, the recognition unit 121 supplies data indicating a type of the recognized action trigger object to the learning unit 122.

Thereafter, the processing proceeds to step S309.

In step S309, the action is started, similarly to the processing of step S106 of FIG. 17.

In step S310, it is determined whether or not the action is completed, similarly to the processing of step S107 of FIG. 17. In a case where it is determined that the action is not completed, the processing proceeds to step S311.

In step S311 it is determined whether or not to stop the action, similarly to the processing of step S108 of FIG. 17. In a case where it is determined not to stop the action, the processing returns to step S310.

Thereafter, the processing of steps S310 and S311 is repeatedly executed until it is determined in step S310 that the action is completed, or it is determined in step S311 to stop the action.

On the other hand, in a case where it is determined in step S310 that the action is completed, the processing proceeds to step S313.

Furthermore, in a case where it is determined in step S311 to stop the action, the processing proceeds to step S312.

In step S312, the action is stopped, similarly to the processing of step S110 of FIG. 17.

Thereafter, the processing proceeds to step S313.

In step S313, the learning unit 122 learns a correlation between the action and the object.

Specifically, the action planning unit 123 supplies the executed action detail and data indicating whether or not the action is completed to the learning unit 122.

The learning unit 122 adds a result of the action of this time to the action history data stored in the storage unit 106.

Furthermore, the learning unit 122 updates the action object correlation data by learning the correlation between each action and the object on the basis of the action history data. For example, the learning unit 122 calculates a degree of correlation (for example, a correlation coefficient) between each action and each object.

Note that, for example, in a case where a certain action is completed, the degree of correlation between the action and an object that triggers the action is made large. On the other hand, for example, in a case where a certain action is stopped in the middle, the degree of correlation between the action and an object that triggers the action is made small.

Then, the learning unit 122 associates an object having a degree of correlation greater than or equal to a predetermined threshold value as an action trigger object, for each action.

Thus, for example, in a case where the user repeatedly presents the same type of object and gives a similar instruction in the past, the object is associated with the action corresponding to the instruction, as an action trigger object.

Thereafter, the processing returns to step S301, and the processing after step S301 is executed.

As described above, it is possible to discipline the autonomous mobile body 11 for the action using the object.

For example, the user repeatedly presents the user's favorite object to the autonomous mobile body 11 and speaks to the autonomous mobile body 11, whereby the autonomous mobile body 11 gradually comes to be able to perform an action of being interested in the object. For example, a child repeatedly presents the child's favorite toy to the autonomous mobile body 11 and speaks "Let's play", whereby the autonomous mobile body 11 gradually comes to play with the toy. Furthermore, for example, in a case where the autonomous mobile body 11 finds the toy, the autonomous mobile body 11 voluntarily plays with the toy.

For example, the user repeatedly presents a food toy to the autonomous mobile body 11 and gives instructions such as "Eat", "Food", and "Remember food", whereby the autonomous mobile body 11 gradually comes to recognize the toy as food. Then, for example, the autonomous mobile body 11 gradually comes to perform an action of eating the toy in a case where the toy is presented. Furthermore, for example, in a case where the autonomous mobile body 11 finds the toy, the autonomous mobile body 11 comes to voluntarily perform the action of eating the toy.

On the contrary, for example, the user repeatedly presents a toy that is not food to the autonomous mobile body 11 and gives instructions such as "You can't eat it" and "It is not food", whereby the autonomous mobile body 11 gradually comes to recognize that the toy is not food. Then, for example, the autonomous mobile body 11 gradually comes to stop performing the action of eating the toy.

Note that, for example, it is also possible to discipline the autonomous mobile body 11 by combining the above-described second method and the third method.

For example, the user repeatedly moves the autonomous mobile body 11 to a place where the toy is to be put away, presents the toy, and gives an instruction such as "Put it away here". As a result, the autonomous mobile body 11 gradually remembers the place and action to put the toy away. For example, at the beginning, the autonomous mobile body 11 sometimes does not put the toy away or puts the toy away in a wrong place even if the user gives an instruction "Put the toy away". However, in the end, the autonomous mobile body 11 comes to be able to put the toy away in an appropriate place if the user gives the instruction "Put the toy away". Furthermore, for example, the autonomous mobile body 11 comes to be able to voluntarily put the toy away in the appropriate place when finding the toy.

<Example of User Interface of Information Processing Terminal 12>

Next, an example of the user interface of the information processing terminal 12 regarding the discipline for the autonomous mobile body 11 will be described with reference to FIGS. 26 to 35.

Figure 26:
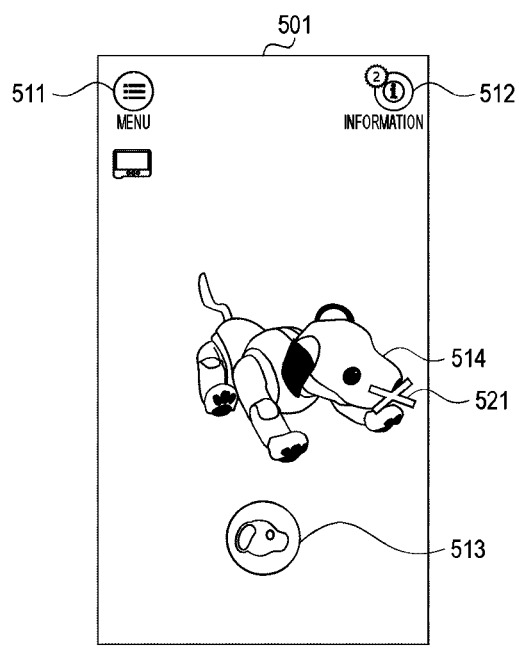
FIG. 26 is a diagram illustrating an example of a user interface of the information processing terminal.
Figure 27:
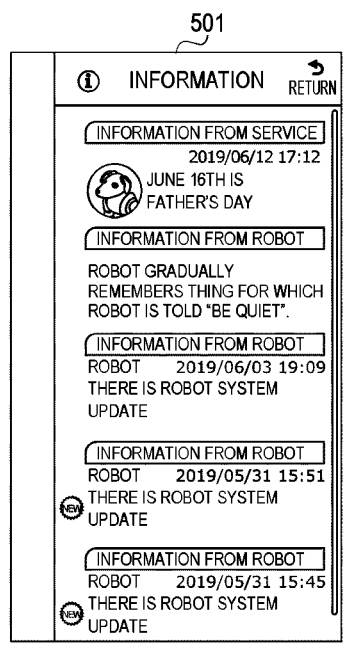
FIG. 27 is a diagram illustrating an example of the user interface of the information processing terminal.
Figure 28:
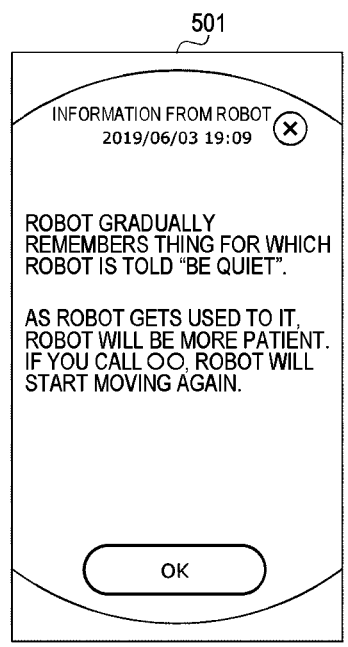
FIG. 28 is a diagram illustrating an example of the user interface of the information processing terminal.

FIGS. 26 to 28 illustrate display examples of a display 501 of the information processing terminal 12 in a case where the autonomous mobile body 11 is executing a silent action.

FIG. 26 illustrates an example of a home screen. Icons 511 to 513 and an animation 514 are displayed on the home screen.

In a case where the icon 511 in the upper left corner of the home screen is pressed, a menu screen is displayed. By transitioning from the menu screen to another screen, the user can confirm, for example, advice on how to raise the autonomous mobile body 11, information regarding the user, and the like.

When the icon 512 in the upper right corner of the home screen is pressed, an information screen is displayed. On the information screen, for example, information regarding the autonomous mobile body 11, information from a company that provides a service regarding the autonomous mobile body 11, and the like are displayed. Furthermore, the number of pieces of unread information is displayed in the upper left of the icon 512. Note that, a specific example of the information screen will be described later.

When the icon 513 at the center and bottom of the home screen is pressed, an information confirmation screen is displayed. On the information confirmation screen, for example, information regarding a character, gender, action, remaining battery level, and the like of the autonomous mobile body 11 is displayed.

The animation 514 is an animation that imitates the autonomous mobile body 11, and represents a current state of the autonomous mobile body 11. In this example, a cross-marked image 521 indicating that the autonomous mobile body 11 is in the silent action is displayed in a mouth portion of the animation 514.

FIG. 27 illustrates an example of the information screen displayed in a case where the icon 512 on the home screen of FIG. 26 is pressed.

Note that, in a "robot" portion of a sentence in the information screen, a product name or a name of the autonomous mobile body 11 is actually entered. This also applies to the following screen examples.

In the second row from the top of the information screen, a situation of the discipline for the silent action of the autonomous mobile body 11 is indicated. In this example, it is indicated that the autonomous mobile body 11 gradually remembers a thing for which the autonomous mobile body 11 is told "Be quiet", and the discipline is progressed.

FIG. 28 illustrates an example of a screen displaying details of the information in the second row from the top of the information screen of FIG. 27. In this example, information is displayed indicating a proficiency level for the discipline for the silent action of the autonomous mobile body 11. Specifically, it is indicated that the autonomous mobile body 11 becomes more patient and quieter as the autonomous mobile body 11 gets used to it. Furthermore, it is indicated that when the name of the autonomous mobile body 11 is called, the silent action is stopped and motion is started.

Note that, for example, the proficiency level may be represented by a specific numerical value or the like.

Figure 29:
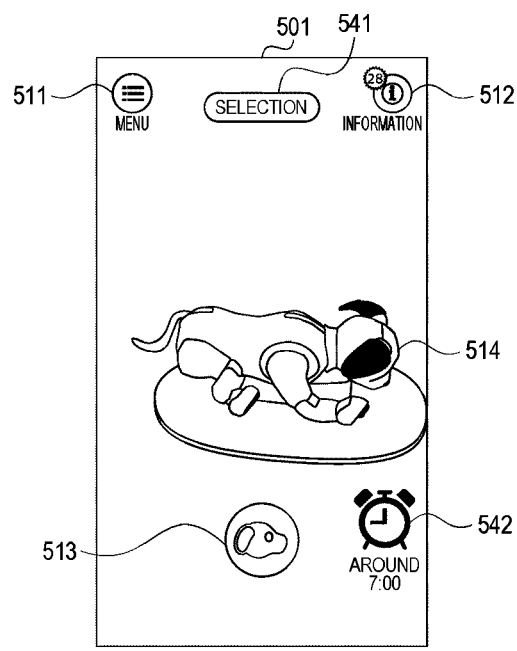
FIG. 29 is a diagram illustrating an example of the user interface of the information processing terminal.
Figure 30:
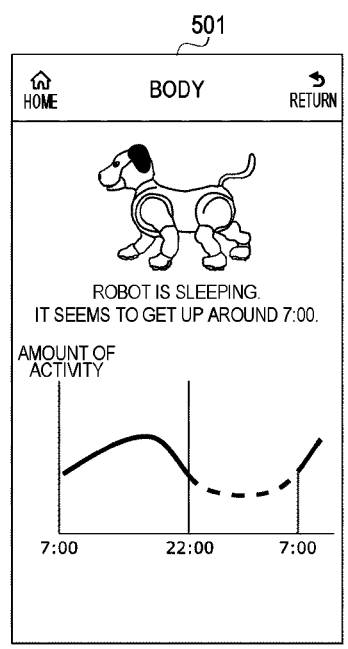
FIG. 30 is a diagram illustrating an example of the user interface of the information processing terminal.
Figure 31:
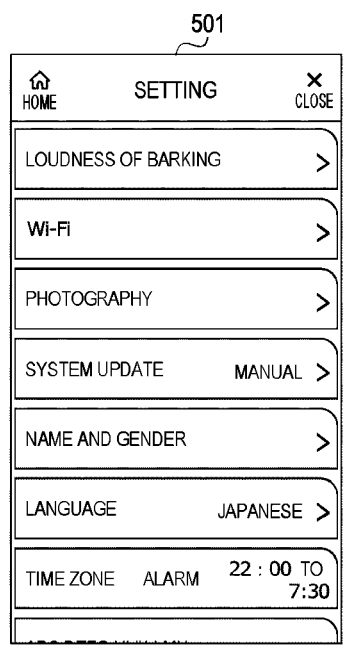
FIG. 31 is a diagram illustrating an example of the user interface of the information processing terminal.

FIGS. 29 to 31 illustrate display examples of the display 501 of the information processing terminal 12 in a case where the autonomous mobile body 11 is sleeping.

FIG. 29 illustrates an example of the home screen. Note that, in the figure, portions corresponding to those in FIG. 26 are designated by the same reference numerals, and the description thereof will be omitted as appropriate.

In the home screen of FIG. 29, the icons 511 to 513 and the animation 514 are displayed, similarly to the home screen of FIG. 26. Furthermore, a button 541 and an icon 542 are added.

The animation 514 indicates that the autonomous mobile body 11 is sleeping.

The button 541 is displayed, for example, in a case where one user owns a plurality of the autonomous mobile bodies 11. When the button 541 is pressed, for example, a screen is displayed for selecting the autonomous mobile body 11 for which information is to be confirmed.

The icon 542 indicates a time when the autonomous mobile body 11 is scheduled to wake up. In this example, it is indicated that the autonomous mobile body 11 is scheduled to wake up around seven o'clock.

FIG. 30 illustrates an example of the information confirmation screen displayed in a case where the icon 513 on the home screen of FIG. 29 is pressed. In this example, a message is displayed indicating that the autonomous mobile body 11 is sleeping and is scheduled to wake up around seven o'clock.

Furthermore, a graph is displayed indicating a transition (biorhythm) of an amount of activity of the autonomous mobile body 11. In this example, it is indicated that the amount of activity of the autonomous mobile body 11 decreases during a period from 22:00 to 7:00.

FIG. 31 illustrates an example of a setting screen displayed in a case where the icon 511 of the home screen of FIG. 29 is pressed. On the setting screen, various setting items regarding the autonomous mobile body 11 are displayed. Among these setting items, in the time zone, the user can explicitly set a bedtime and a wake-up time of the autonomous mobile body 11.

FIGS. 32 to 35 illustrate display examples of the display 501 of the information processing terminal 12 in a case of confirming the proficiency level and the like of the autonomous mobile body 11 for discipline.

Figure 32:
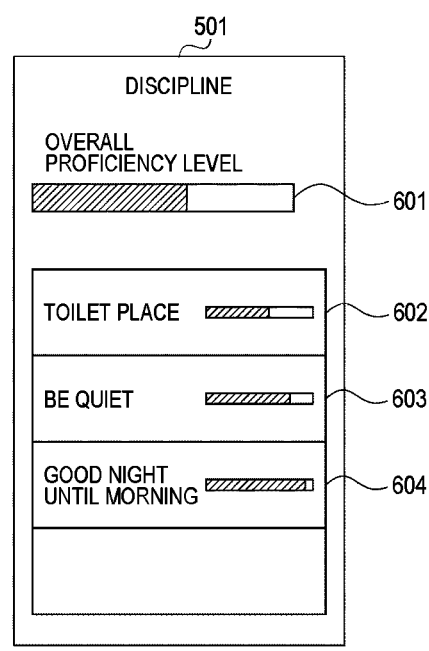
FIG. 32 is a diagram illustrating an example of the user interface of the information processing terminal.

FIG. 32 illustrates an example of a main screen for confirming the proficiency level of the autonomous mobile body 11 for discipline.

Graphs 601 to 604 are displayed to be arranged in the vertical direction on the main screen.

The graph 601 indicates an overall proficiency level of the autonomous mobile body 11. The overall proficiency level is calculated on the basis of the proficiency level for each discipline item.

The graph 602 indicates the proficiency level for discipline at a urination place (toilet place).

The graph 603 illustrates the proficiency level for discipline for the silent action.

The graph 604 illustrates the proficiency level for discipline for the sleeping action.

Figure 33:
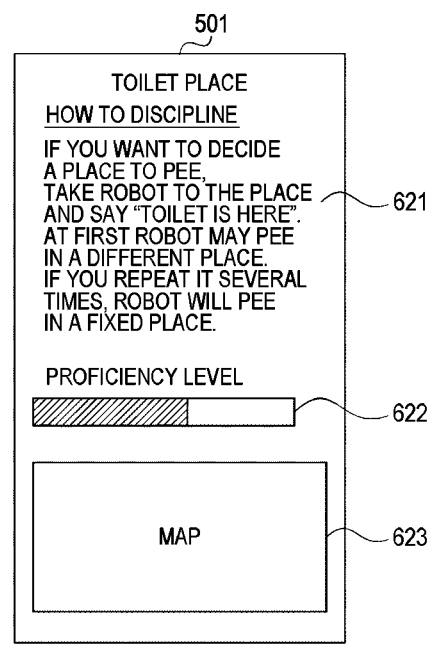
FIG. 33 is a diagram illustrating an example of the user interface of the information processing terminal.

FIG. 33 illustrates an example of a screen displayed in a case where the graph 602 is selected in the main screen of FIG. 32.

In this example, a message 621 is displayed to guide how to discipline the urination place.

Below the message 621, a graph 622 is displayed indicating the proficiency level for discipline for the urination place.

Below the graph 622, a map 623 is displayed indicating the currently set urination place although detailed illustration is omitted. Note that, instead of the map 623, a link to the map indicating the urination place may be displayed.

Figure 34:
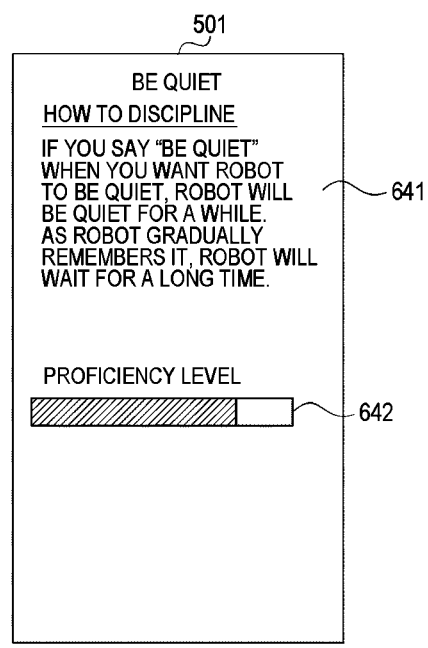
FIG. 34 is a diagram illustrating an example of the user interface of the information processing terminal.

FIG. 34 illustrates an example of a screen displayed in a case where the graph 603 is selected on the main screen of FIG. 32.

In this example, a message 641 is displayed to guide how to discipline the silent action.

Below the message 641, a graph 642 is displayed indicating the proficiency level for discipline for the silent action.

Figure 35:
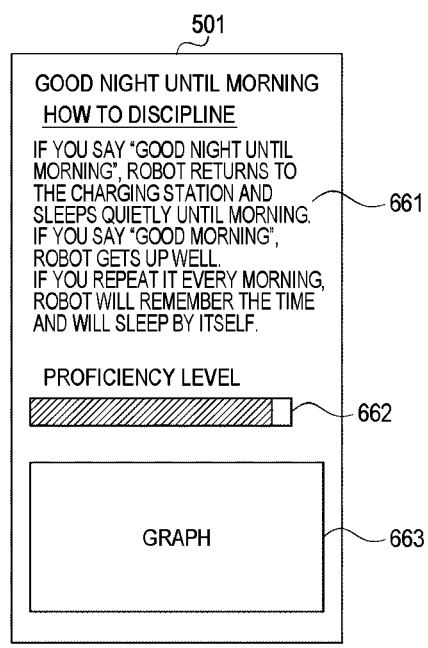
FIG. 35 is a diagram illustrating an example of the user interface of the information processing terminal.

FIG. 35 illustrates an example of a screen displayed in a case where the graph 604 is selected in the main screen of FIG. 32.

In this example, a message 661 is displayed to guide how to discipline the sleeping action.

Below the message 661, a graph 662 is displayed indicating the proficiency level for discipline for the sleeping action.

Below the graph 662, for example, a graph is displayed similar to the graph of the amount of activity of FIG. 30 although detailed illustration is omitted.

As described above, the user can confirm the current state of the autonomous mobile body 11, how to discipline, the proficiency level for discipline, and the like by using the information processing terminal 12.

2. Modifications

Hereinafter, modifications of the above-described embodiment of the present technology will be described.

For example, by being disciplined for a certain action, the autonomous mobile body 11 may naturally improve the proficiency level for another action without being disciplined for the other action. In particular, the proficiency may be made to improve more in an action that is similar to or related to an action for which the proficiency level is improved due to discipline.

For example, in a case where an interval at which the user performs discipline is widened to greater than or equal to a predetermined threshold value, the autonomous mobile body 11 may gradually forget an action corresponding to the discipline. For example, in a case where the user does not perform discipline for a certain action for a long period of time, the proficiency level for the action may be decreased. Note that, for example, in a case where the proficiency level for a certain action exceeds a predetermined threshold value, the proficiency level for the action may be made not to decrease even if discipline for the action is not performed for a long period of time.

For example, the autonomous mobile body 11 may select a person from whom the autonomous mobile body 11 is disciplined. For example, in a case where a person recognized by the autonomous mobile body 11 is the user or the user's family or relative, the autonomous mobile body 11 may be disciplined by the person, and in a case where the recognized person is another person, the autonomous mobile body 11 may be made not to be disciplined by the other person.

For example, the number of times of instruction action described above may include the number of times the action for which the instruction is given is stopped in the middle and not completed.

3. Others

<Configuration Example of Computer>

A series of processing steps described above can be executed by hardware, or can be executed by software. In a case where the series of processing steps is executed by software, a program constituting the software is installed in a computer. Here, the computer includes a computer incorporated in dedicated hardware, and a computer capable of executing various functions by installation of various programs, for example, a general purpose personal computer, and the like.

Figure 36:
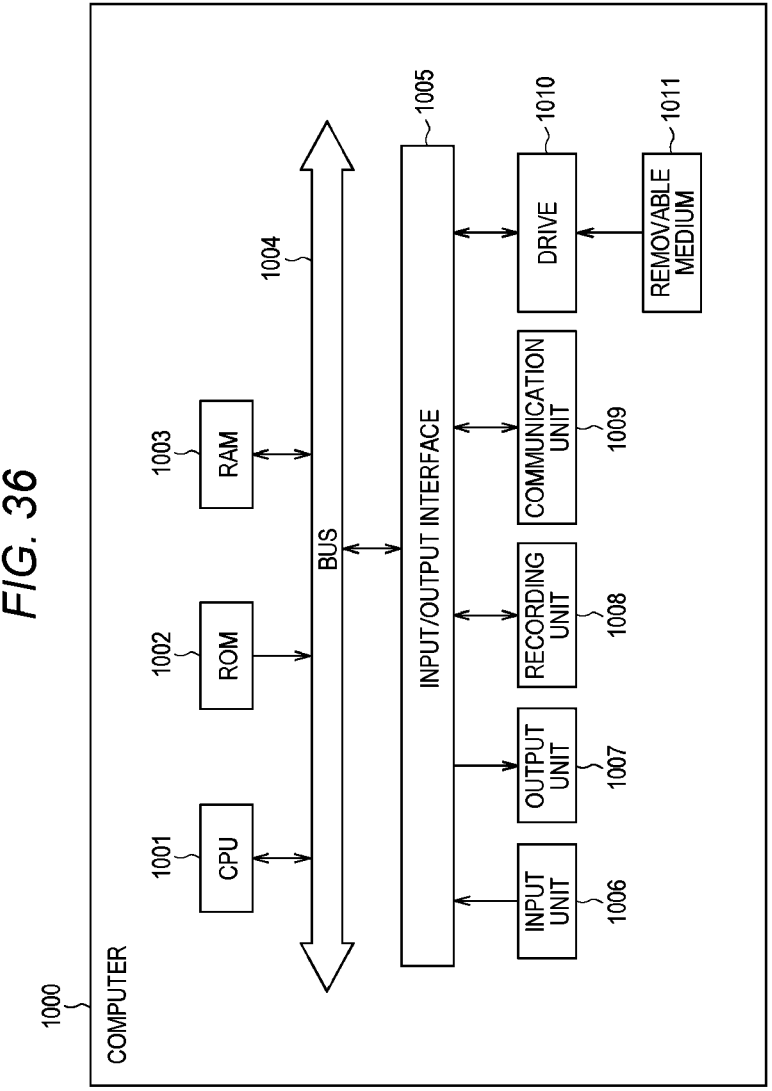
FIG. 36 is a diagram illustrating a configuration example of a computer.

FIG. 36 is a block diagram illustrating a configuration example of hardware of the computer that executes the above-described series of processing steps by the program.

In a computer 1000, a central processing unit (CPU) 1001, a read only memory (ROM) 1002, and a random access memory (RAM) 1003 are connected to each other by a bus 1004.

Moreover, an input/output interface 1005 is connected to the bus 1004. The input/output interface 1005 is connected to an input unit 1006, an output unit 1007, a recording unit 1008, a communication unit 1009, and a drive 1010.

The input unit 1006 includes an input switch, a button, a microphone, an imaging element, and the like. The output unit 1007 includes a display, a speaker, and the like. The recording unit 1008 includes a hard disk, a nonvolatile memory, or the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, for example, the CPU 1001 loads the program recorded in the recording unit 1008 to the RAM 1003 via the input/output interface 1005 and the bus 1004 to execute the above-described series of processing steps.

The program executed by the computer 1000 (CPU 1001) can be provided, for example, by being recorded in the removable medium 1011 as a package medium or the like. Furthermore, the program can be provided via a wired or wireless transmission medium such as a local area network, the Internet, or digital satellite broadcasting.

In the computer 1000, the program can be installed to the recording unit 1008 via the input/output interface 1005 by mounting the removable medium 1011 to the drive 1010. Furthermore, the program can be received by the communication unit 1009 via the wired or wireless transmission medium, and installed to the recording unit 1008. In addition, the program can be installed in advance to the ROM 1002 or the recording unit 1008.

Note that, the program executed by the computer can be a program by which the processing is performed in time series along the order described in the present specification, and can be a program by which the processing is performed in parallel or at necessary timing such as in a case where a call is performed.

Furthermore, in the present specification, a system means an aggregation of a plurality of constituents (device, module (component), and the like), and it does not matter whether or not all of the constituents are in the same cabinet. Thus, a plurality of devices that is accommodated in a separate cabinet and connected to each other via a network and one device that accommodates a plurality of modules in one cabinet are both systems.

Moreover, the embodiment of the present technology is not limited to the embodiment described above, and various modifications are possible without departing from the scope of the present technology.

For example, the present technology can adopt a configuration of cloud computing that shares one function in a plurality of devices via a network to perform processing in cooperation.

Furthermore, each step described in the above flowchart can be executed by sharing in a plurality of devices, other than being executed by one device.

Moreover, in a case where a plurality of pieces of processing is included in one step, the plurality of pieces of processing included in the one step can be executed by sharing in a plurality of devices, other than being executed by one device.

Combination Example of Configurations

The present technology can also have a configuration as follows.

(1)
An autonomous mobile body including:
a recognition unit that recognizes an instruction given;
an action planning unit that plans an action on the basis of the instruction recognized; and
an operation control unit that controls execution of the action planned, in which
the action planning unit changes a detail of a predetermined action as an action instruction that is an instruction for the predetermined action is repeated.

(2)
The autonomous mobile body according to (1), in which the action planning unit changes the detail of the predetermined action on the basis of the number of times of the instruction that is the number of times the action instruction is given.

(3)
The autonomous mobile body according to (2), in which the action planning unit improves a proficiency level for the predetermined action as the number of times of the instruction increases.

(4)
The autonomous mobile body according to (3), in which the action planning unit improves the proficiency level for the predetermined action as the number of times the predetermined action is completed increases out of the number of times of the instruction.

(5)
The autonomous mobile body according to (3) or (4), in which
the action planning unit improves the proficiency level for the predetermined action and improves a proficiency level for an action different from the predetermined action.

(6)
The autonomous mobile body according to any of (3) to (5), in which
the action planning unit lowers the proficiency level for the predetermined action in a case where an interval of the action instruction is widened.

(7)

The autonomous mobile body according to any of (1) to (6), in which
the recognition unit further recognizes a situation,
a learning unit is further included, the learning unit learning a correlation between the situation in which the instruction is given and the action for which the instruction is given, and
the action planning unit plans the action on the basis of the situation recognized by the recognition unit and a result of learning the correlation.

(8)

The autonomous mobile body according to (7), in which
in a case where the action for which the instruction is given is completed, the learning unit increases a degree of correlation between the situation in which the instruction is given and the action for which the instruction is given, and in a case where the action for which the instruction is given is stopped in the middle, the learning unit decreases the degree of correlation.

(9)

The autonomous mobile body according to (7) or (8), in which
the learning unit estimates a time series transition of an expected value for the predetermined action on the basis of a distribution of a time at which the instruction for the predetermined action is given, and
the action planning unit plans the action on the basis of the expected value.

(10)

The autonomous mobile body according to (9), in which
the action planning unit increases the expected value in a case where an instruction to promote the predetermined action is given, and decreases the expected value in a case where an instruction to suppress the predetermined action is given.

(11)

The autonomous mobile body according to (9) or (10), in which
the action planning unit plans the predetermined action or an action similar to the predetermined action in a case where the expected value is greater than or equal to a predetermined threshold value.

(12)

The autonomous mobile body according to any of (1) to (11), further including
a learning unit that learns an action place that is a place where the predetermined action is performed, on the basis of a history of an indicated place that is a place for which an instruction to perform the predetermined action is given in the past, in which
the action planning unit determines the place where the predetermined action is performed, on the basis of a result of learning the action place.

(13)

The autonomous mobile body according to (12), in which
the learning unit sets one or more of the action places on the basis of a distribution of the indicated place, and
the action planning unit determines the place where the predetermined action is performed, on the basis of the action place and a current position.

(14)

The autonomous mobile body according to (13), in which
the learning unit sets a degree of certainty of the action place on the basis of the distribution of the indicated place, and
the action planning unit determines the place where the predetermined action is performed, on the basis of the action place, the degree of certainty, and the current position.

(15)

The autonomous mobile body according to (13) or (14), in which
the learning unit sets the action place by performing clustering of the indicated place.

(16)

The autonomous mobile body according to any of (1) to (15), in which
the recognition unit further recognizes an object,
a learning unit is further included, the learning unit learning a correlation between the object indicated and an action for which an instruction is given along with indication of the object, and
the action planning unit plans the action on the basis of the object recognized by the recognition unit and a result of learning the correlation.

(17)

An information processing method including:
recognizing an instruction given to an autonomous mobile body;
planning an action of the autonomous mobile body on the basis of the instruction recognized, and changing a detail of a predetermined action as an action instruction that is an instruction for the predetermined action is repeated; and
controlling execution of the action of the autonomous mobile body planned.

(18)

A program for causing a computer to execute processing of:
recognizing an instruction given to an autonomous mobile body;
planning an action of the autonomous mobile body on the basis of the instruction recognized, and changing a detail of a predetermined action as an action instruction that is an instruction for the predetermined action is repeated; and controlling execution of the action of the autonomous mobile body planned.

(19)

An information processing device including:
a recognition unit that recognizes an instruction given to an autonomous mobile body;
an action planning unit that plans an action of the autonomous mobile body on the basis of the instruction recognized; and
an operation control unit that controls execution of the action of the autonomous mobile body planned, in which
the action planning unit changes a detail of a predetermined action by the autonomous mobile body as an action instruction that is an instruction for the predetermined action is repeated.

Note that, the advantageous effects described in the present specification are merely examples, and the advantageous effects of the present technology are not limited to them and may include other effects.

REFERENCE SIGNS LIST

1 Information processing system
11 Autonomous mobile body
12 Information processing terminal
1 Information processing server 103 Information processing unit
104 Drive unit
105 Output unit
121 Recognition unit
122 Learning unit
123 Action planning unit
124 Operation control unit
151 Expected value calculation unit
203 Information processing unit
204 Output unit
302 Information processing unit
321 Autonomous mobile body control unit
322 Application control unit
331 Recognition unit
332 Learning unit
333 Action planning unit
334 Operation control unit

The invention claimed is:

1. An autonomous mobile body, comprising:
a central processing unit (CPU) unit configured to:
recognize a first action instruction associated with a first action;
determine a first number of times the first action instruction is repeated;
change a detail of the first action based on the determined first number of times the first action instruction is repeated;
determine a second number of times the first action instruction is completed out of the determined first number of times the first action instruction is repeated;
improve a proficiency level of the first action based on an increase in the determined second number of times the first action instruction is completed;
plan the first action based on the first action instruction, the changed detail of the first action, and the improved proficiency level of the first action; and
control execution of the planned first action.

2. The autonomous mobile body according to claim 1, wherein
the action CPU is further configured to improve a proficiency level of a second action based on the improved proficiency level of the first action, and
the second action is different from the first action.

3. The autonomous mobile body according to claim 1, wherein the CPU is further configured to:
determine that an interval of the first action instruction is greater than a threshold value; and
decrease the proficiency level of the first action based on the determination that the interval of the first action instruction is greater than the threshold value.

4. The autonomous mobile body according to claim 1, wherein the CPU is further configured to:
recognize a first situation in which the first action instruction is recognized;
learn a correlation between the recognized first situation and the first action; and
plan the first action based on the recognized first situation and the learned correlation.

5. The autonomous mobile body according to claim 4, wherein the CPU is further configured to:
increase, in a case where the first action is completed, a degree of correlation between the recognized first situation and the first action; and
decrease, in a case where the first action is stopped in middle of the execution of the first action, the degree of correlation between the recognized first situation and the first action.

6. The autonomous mobile body according to claim 4, wherein the CPU is further configured to:
estimate a time series transition of an expected value of the first action, wherein
the time series transition is estimated based on a distribution of a time at which the first action instruction is recognized; and
plan the first action based on the estimated time series transition of the expected value.

7. The autonomous mobile body according to claim 6, wherein the CPU is further configured to:
recognize one of a second action instruction to promote the first action or a third action instruction to suppress the first action;
increase, in a case where the second action instruction is recognized, the expected value of the first action; and
decrease, in a case where the third action instruction is recognized, the expected value of the first action.

8. The autonomous mobile body according to claim 6, wherein the CPU is further configured to:
determine the expected value of the first action is one of equal to or greater than a threshold value; and
plan, based on the determination that the expected value of the first action is the one of equal to or greater than the threshold value, one of the first action or a second action, wherein the second action is similar to the first action.

9. The autonomous mobile body according to claim 1, wherein the CPU is further configured to:
learn, based on history information of the first action, a first action place of the first action, wherein
the history information includes a second place from where a second action instruction to perform the first action is recognized in a past, and
the first action is performed at the second place based on the recognized second action instruction; and
determine the first action place based on the learned first action place.

10. The autonomous mobile body according to claim 9, wherein the CPU is further configured to:
set at least one action place based on a distribution of a plurality of indicated places, wherein
the plurality of indicated places includes places where the first action is performed in the past, and
the plurality of indicated places includes the second place; and
determine the first action place based on the set at least one action place and a current position of the autonomous mobile body.

11. The autonomous mobile body according to claim 10, wherein the CPU is further configured to:
set a degree of certainty of the first action place based on the distribution of the plurality of indicated places; and
determine the first action place based on the set at least one action place, the set degree of certainty, and the current position of the autonomous mobile body.

12. The autonomous mobile body according to claim 10, wherein the CPU is further configured to:
cluster the plurality of indicated places; and
set the first action place based on the clustered plurality of indicated places.

13. The autonomous mobile body according to claim 1, wherein the CPU is further configured to:
recognize a second action instruction, wherein the second action instruction is given along with an indication of an object;
learn a correlation between the indicated object and a second action, wherein the second action corresponds to the recognized second action instruction; and
plan the second action based on the recognized second action instruction and the learned correlation.

14. An information processing method, comprising:
recognizing an action instruction associated with an action;
determining a first number of times the action instruction is repeated;
changing a detail of the action based on the determined first number of times the action instruction is repeated;
determining a second number of times the action is completed out of the determined first number of times the action instruction is repeated;
improving a proficiency level of the action based on an increase in the determined second number of times the action instruction is completed;
planning the action based on the action instruction, the changed detail of the action, and the improved proficiency level of the action; and
controlling execution of the planned action.

15. A non-transitory computer-readable medium having stored thereon, computer executable instructions, which when executed by a computer, cause the computer to execute operations, the operations comprising:
recognizing an action instruction associated with an action;
determining a first number of times the action instruction is repeated;
changing a detail of the action based on the determined first number of times the action instruction is repeated;
determining a second number of times the action is completed out of the determined first number of times the action instruction is repeated;
improving a proficiency level of the action based on an increase in the determined second number of times the action is completed;
planning the action based on the action instruction, the changed detail of the action, and the improved proficiency level of the action; and
controlling execution of the planned action.

16. An information processing device, comprising:
a central processing unit (CPU) unit configured to:
recognize an action instruction associated with an action, wherein the action instruction is given to an autonomous mobile body;
determine a first number of times the action instruction is repeated;
change a detail of the action based on the determined first number of times the action instruction is repeated;
determine a second number of times the action instruction is completed out of the determined first number of times the action instruction is repeated;
improve a proficiency level of the action based on an increase in the determined second number of times the action instruction is completed;
plan the action of the autonomous mobile body based on the action instruction, the changed detail of the action, and the improved proficiency level of the action; and
control execution of the planned action.

\* \* \* \* \*